United States Patent
Lee et al.

(10) Patent No.: US 10,020,091 B2
(45) Date of Patent: Jul. 10, 2018

(54) CONDUCTIVE COMPOSITE, MANUFACTURING METHOD THEREOF, AND ELECTRONIC DEVICE INCLUDING SAME

(71) Applicants: SAMSUNG ELECTRONICS CO., LTD., Suwon-si, Gyeonggi-do (KR); The Industry & Academic Cooperation in Chungnam National University, Daejeon (KR)

(72) Inventors: Sang Eui Lee, Hwaseong-si (KR); Yeonggyu Jeong, Daejeon (KR); Kyoung-Seok Moon, Hwaseong-si (KR); Hiesang Sohn, Seoul (KR); Taewon Lee, Namyangju-si (KR); In Taek Han, Seoul (KR)

(73) Assignees: Samsung Electronics Co., Ltd., Gyeonggi-do (KR); The Industry & Academic Cooperation in Chungnam National University, Daejeon (KR)

( * ) Notice: Subject to any disclaimer, the term of this patent is extended or adjusted under 35 U.S.C. 154(b) by 0 days.

(21) Appl. No.: 15/190,909

(22) Filed: Jun. 23, 2016

(65) Prior Publication Data
US 2017/0221599 A1    Aug. 3, 2017

(30) Foreign Application Priority Data
Jan. 29, 2016 (KR) .................. 10-2016-0011941

(51) Int. Cl.
*H01B 1/24* (2006.01)
*H01B 1/22* (2006.01)
(Continued)

(52) U.S. Cl.
CPC ................ *H01B 1/24* (2013.01); *C08J 5/005* (2013.01); *H01B 1/22* (2013.01); *B82Y 30/00* (2013.01);
(Continued)

(58) Field of Classification Search
CPC ........ C08J 5/005; B82Y 30/00; C01B 32/158; H01B 1/20–1/24
(Continued)

(56) References Cited

U.S. PATENT DOCUMENTS 9,150,746 B1    10/2015   Li et al.
2014/0225039 A1   8/2014   Chiang et al.
(Continued)

FOREIGN PATENT DOCUMENTS

JP    2014-055323 A    3/2014

OTHER PUBLICATIONS

ASM Engineering Materials reference book, 2nd ed, 1994.
(Continued)

*Primary Examiner* — Matthew D Matzek
(74) *Attorney, Agent, or Firm* — Harness, Dickey & Pierce, P.L.C.

(57) ABSTRACT

A conductive composite including: a polymer matrix including a microcellulose fiber; and at least two conductive nanomaterials dispersed in the polymer matrix, wherein the conductive nanomaterial includes a metal nanowire, wherein the at least two of the conductive nanomaterials provide an assembled layer surrounding a surface of the microcellulose fiber.

17 Claims, 19 Drawing Sheets

(51) Int. Cl.
C08J 5/00 (2006.01)
B82Y 30/00 (2011.01)
(52) U.S. Cl.
CPC ........ C08J 2301/02 (2013.01); Y10S 977/752
(2013.01); Y10S 977/762 (2013.01); Y10S
977/783 (2013.01); Y10S 977/932 (2013.01)
(58) Field of Classification Search
USPC .................. 428/535; 162/138; 442/153, 165;
977/734, 742, 750, 752, 753, 762, 773,
977/778, 779, 784, 785
See application file for complete search history.

(56) References Cited

U.S. PATENT DOCUMENTS

2014/0302336 A1* 10/2014 Heiskanen ............... C08K 3/34
428/535
2015/0014039 A1 1/2015 Nogi et al.
2015/0030783 A1 1/2015 Suganuma et al.

OTHER PUBLICATIONS

Chunhua Liu et al. "Preparation of Silver Nanoparticle and Its Application to the Determination of ct-DNA", Sensors 2007, 7(5), 708-718.
Chun-Sheng Zhang et al. "Electromagnetic interference shielding effect of nanocomposites with carbon nanotube and shape memory polymer", Composites Science and Technology 67(14) (2007) 2973-2980.
David Markham "Shileding: quantifiying the shielding requirements for portable electronic design and providing new solutions by using a combination of materials and design", Materials and Design 21(1) (2000) 45-50.
Ding-Xiang Yan et al. "Efficient electromagnetic interference shielding of lightweight graphene/polystyrene composite", J. Mater. Chem. 2012, 22(36), 18772-18774.
Ding-Xiang Yan et al. "Structured Reduced Graphene Oxide/Polymer Composites for Ultra-Efficient Electromagnetic Interference Shielding" Adv. Funct. Mater. 2015, 25(4), 559-566.
Genaro A. Gelves et al. "Highly electrically conductive and high performance EMI shielding nanowire/polymer nanocomposites by miscible mixing and precipitation", J. Mater. Chem. 2011, 21, 829-836.
Hai-Wei Liang et al. "Highly conductive and stretchable conductors fabricated from bacterial cellulose", NPG Asia Materials (2012) 4, e19.
Hirotaka Koga et al. "Uniformly connected conductive networks on cellulose nanofiber paper for transparent paper electronics", NPG Asia Materials (2014), 6, e93.
Hua-Dong Huang et al. "Cellulose composite aerogel for highly efficient electromagnetic interference shielding", J. Mater. Chem. A, 2015, 3, 4983-4991.
Jan-Chan Huang et al. "EMI Shielding Plastics: A Review", Advances in Polymer Technology, vol. 14, No. 2, 137-150 (1995).
Jean-Michel Thomassin et al. "Multiwalled Carbon Nanotube/Poly(caprolactone) Nanocomposites with Exceptional Electromagnetic Interference Shielding Properties", J. Phys. Chem. C 2007, 111, 11186-11192.
Jean-Michel Thomassin et al. "Polymer/carbon based composites as electromagnetic interference (EMI) shielding materials", Materials Science and Engineering R 74 (2013) 211-232.
Jiajie Liang et al. "Electromagnetic interference shielding of graphene/epoxy composites", Carbon 47(3) (2009) 922-925.
Jianqiang Ling et al. "Facile Preparation of Lightweight Microcellular Polyetherimide/Graphene Composite Foams for Electromagnetic Interference Shielding", ACS Appl. Mater. Interfaces 2013, 5(7), 2677-2684.

Jingjing Ma et al. "Ultralightweight Silver Nanowires Hybrid Polyimide Composite Foams for High-Performance Electromagnetic Interference Shielding", ACS App. Mater. Interfaces 2015, 7, 563-576.
Keerthi G. Nair et al. "Direct-writing of circuit interconnects on cellulose paper using ultra-long, silver nanowires based conducting ink", RCS Adv. 2015, 5, 76092-76100.
Liangbing Hu et al. "Stretchable, Porous, and Conductive Energy Textiles", Nano Lett. 2010, 10(2), 708-714.
Masanori Imai et al. "Composites Science and Technology", Composite Science and Technology 70 (2010) 1564-1570.
Mingjun Hu et al. "Flexible Transparent PES/Silver Nanowires/PET Sandwich-Structured Film for High-Efficiency Electromagnetic Interference Shielding", Langmuir 2012, 28(18), 7101-7106.
Mohammad Arjmand et al. "Comparative study of electromagnetic interference shielding properties of injection molded versus compression molded multi-walled carbon nanotube/polystyrene composites", Carbon 50(14) (2012) 5126-5134.
Mohammad R. Nateghi et al. "Silver nanowire-functionalized cotton fabric", Carbohydrate Polymers 117 (2015) 160-168.
Mohammad Shateri-Khalilabad et al. "Fabricating electroconductive cotton textiles using graphene", Carbohydrate Polymers 96(1) (2013) 190-195.
Ning Li et al. "Electromagnetic Interference (EMI) Shielding of Single-Walled Carbon Nanotube Epoxy Composites", Nano Letters 2006, vol. 6, No. 6, 1141-1145.
Paul Theilmann et al. "Superior electromagnetic interference shielding and dielectric properties of carbon nanotube composites through the use of high aspect ratio CNTs and three-roll milling", Organic Electronics 14 (2013) 1531-1537.
Sadie I. White et al. "Electrical Percolation Behavior in Silver Nanowire-Polystyrene Composites: Simulation and Experiment", Adv. Funct. Mater. 2010, 20(16), 2709-2716.
Sandip Maiti et al. "Polystyrene/MWCNT/Graphite Nanoplate Nanocomposites: Efficient Electromagnetic Interference Shielding Material through Graphite Nanoplate-MWCNT-Graphite Nanoplate Networking", ACS Appl. Mater. Interfaces 2013, 5(11), 4712-4724.
Shaokun Tang et al. "PEG-funtionalized ionic liquids for cellulose dissolution and saccharification", Green Chem. 2012, 14(10), 2922-2932.
Shravan Kumar Parmar et al. "In situ formation of silver nanowire networks on paper", Current Science, vol. 107, No. 2, 262-269.
Shuying Yang et al. "Electromagnetic interference shielding effectiveness of carbon nanofiber/LCP composites", Composites: Part A 36(5) (2005) 691-697.
Stretchable active-matrix organic light-emitting diode display using printable elastic conductors, Nature Materials 2009, 8, 494-499.
Van Hoang Luan et al. "Novel conductive epoxy composites composed of 2-D chemically reduced graphene and 1-D silver nanowire hybrid fillers", J. Mater. Chem. 2012, 22(17), 8649-8653.
Weili Hu et al. "Intrinsically stretchable transparent electrodes based on silver-nanowire-crosslinked-polyacrylate composites", Nanotechnology 23(34) (2012) 344002 (9pp).
Yi-Hsivan Yu et al. "Electrical, morphological, and electromagnetic interference shielding properties of silver nanowires and nanoparticles conductive composites", Materials Chemistry and Physics 136 (2012) 334-340.
Yoshiharu Nishiyama et al. "Crystal Structure and Hydrogen-Bonding System in Cellulose Iβ from Synchrotron X-ray and Neutron Fiber Diffraction", J. Am. Chem. Soc. 2002, 124(31), 9074-9082.
Yuan-Qing Li et al. "Lightweight and Highly Conductive Aerogel-like Carbon from Sugarcase with Superior Mechanical and EMI Shielding Properties", ACS Sustainable Chem. Eng. 2015, 3, 1419-1427.
Zunfeng Liu et al. "Reflection and absorption contributions to the electromagnetic interference shielding of single-walled carbon nanotube/polyurethane composites", Carbon 45(4) (2007) 821-827.

* cited by examiner

CONDUCTIVE COMPOSITE, MANUFACTURING METHOD THEREOF, AND ELECTRONIC DEVICE INCLUDING SAME

CROSS-REFERENCE TO RELATED APPLICATION

This application claims priority to Korean Patent Application No. 10-2016-0011941 filed in the Korean Intellectual Property Office on Jan. 29, 2016, and all the benefits accruing therefrom under 35 U.S.C. § 119, the content of which is incorporated herein in its entirety by reference.

BACKGROUND

1. Field

A cellulose-based conductive composite, a manufacturing method thereof, and an electronic device including the same are disclosed.

2. Description of the Related Art

Currently, various commercially available electronic devices emit electromagnetic radiation which may disturb and interrupt a broadcast by television, radio and other communication devices. Such an interrupting phenomenon caused by the electromagnetic radiation is called electromagnetic interference (hereinafter referred to as EMI).

It is thus desired to limit the EMI emitted from various electronic devices within an appropriate range, so ongoing studies on an EMI shielding material have been carried out to shield the EMI release from the electronic devices.

EMI shielding methods include suppressing the electromagnetic radiation generated from the source of electromagnetic radiation in an electronic device, and blocking the radiation from being emitted to the outside of the electronic device. When the emitting device is surrounded by a material such as a metal can having a metal bond and high electrical conductivity, it may be shielded by the Faraday shield effect.

However, there remains a need in further research of various electromagnetic wave shielding materials, which are capable of substituting pure metal in lighter-weight electronic devices, easier processes, and the like.

SUMMARY

An embodiment provides a light in weight conductive composite having an improved EMI shield effect, a method of manufacturing, and an electronic device including the same.

According to an embodiment, a conductive composite includes:

a polymer matrix including a microcellulose fiber; and at least two conductive nanomaterials dispersed in the polymer matrix, wherein the conductive nanomaterial includes a metal nanowire, wherein the at least two conductive nanomaterials provide an assembled layer surrounding a surface of the microcellulose fiber.

A diameter of the microcellulose fiber may be about 1 micrometer to about 990 micrometers.

A diameter of the metal nanowire may be about 1 nanometer to about 30 nanometers.

The metal nanowire may include silver, gold, platinum, palladium, cobalt, nickel, titanium, copper, tantalum, tungsten, or a combination thereof.

The conductive nanomaterial may further include a carbon nanotube, a graphene nanoparticle, a carbon nanofiber, carbon black, or a combination thereof.

The carbon nanotube may include a single-walled carbon nanotube, a multi-walled carbon nanotube, or a combination thereof.

A diameter of the carbon nanotube may be about 1 nanometer to about 20 nanometers.

The assembled layer may include at least two layers wherein the metal nanowire and the carbon nanotube are alternately stacked.

An amount of the conductive nanomaterial in the conductive composite may be about 0.01 percent by volume to about 0.53 percent by volume, based on a total volume of the conductive composite.

The assembled layer may have a density gradient extending from the surface of the polymer matrix to the inside of the polymer matrix in such a way that the density of the assembled layer is decreased from the surface of the polymer matrix to the inside of the polymer matrix.

The polymer matrix may be a cellulose fiber non-woven fabric.

Porosity of the conductive composite may be about 20% to about 90%.

An apparent density of the conductive composite may be less than or equal to about 0.6 grams per cubic centimeter.

Electrical conductivity of the conductive composite may be greater than or equal to about 0.34 Siemens per centimeter.

According to another embodiment, a method of manufacturing the conductive composite includes:

providing the polymer matrix, contacting the polymer matrix with a conductive nanomaterial solution including the metal nanowire to form a layer of the conductive nanomaterial disposed on the surface of the polymer matrix, and drying the layer of the conductive nanomaterial disposed on the polymer matrix to provide the conductive nanocomposite.

The conductive nanomaterial solution may further include a carbon nanotube, a graphene nanoparticle, a carbon nanofiber, carbon black, or a combination thereof.

The method of manufacturing the conductive composite may further include:

determining whether the contacting and drying are repeatedly carried out after the drying.

According to another embodiment, an electronic device including the conductive composite is provided.

BRIEF DESCRIPTION OF THE DRAWINGS

The above and other advantages and features of this disclosure will become more apparent by describing exemplary embodiments thereof in further detail with reference to the accompanying drawings, in which:

FIGS. 8 and 9 are graphs of electro-conductivity EC (Siemens per meter, S/m) versus number of dip-dry cycles, showing electro-conductivity according to the number of repeated dipping-drying unit cycles of a conductive composite according to an embodiment, wherein FIG. 8 shows electro-conductivity in a plane direction of the conductive composite, and FIG. 9 shows electro-conductivity in a thickness direction of the conductive composite;

DETAILED DESCRIPTION

Figure 1:
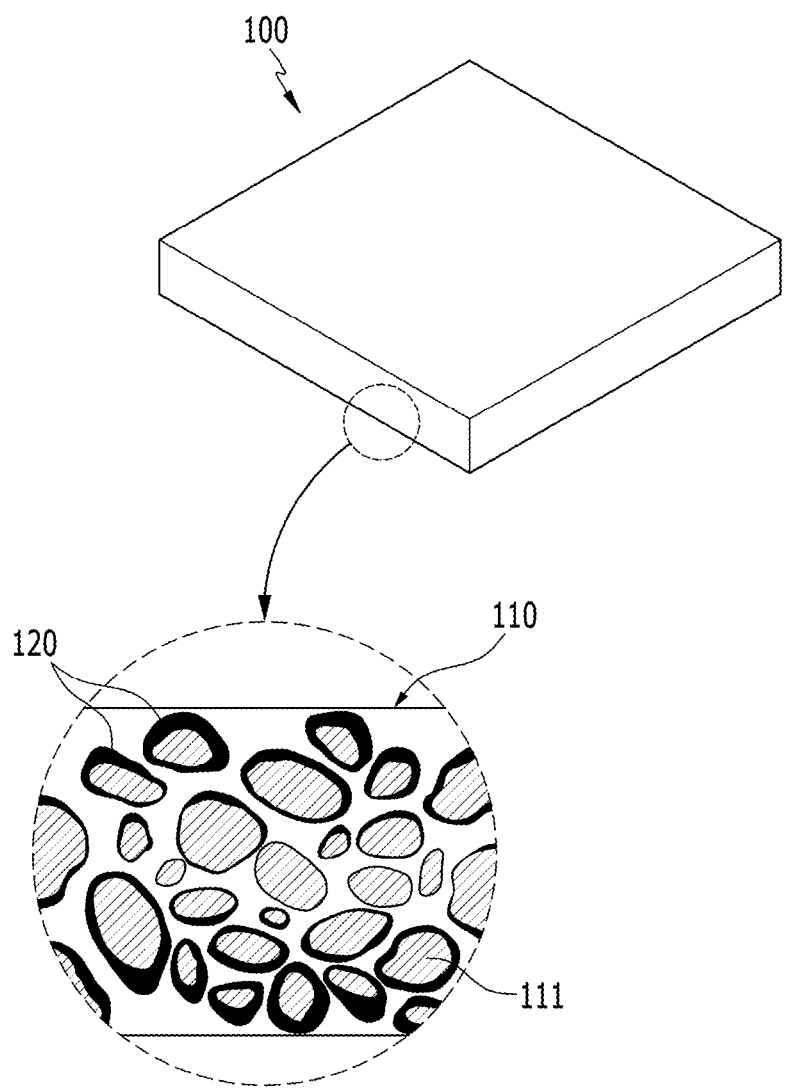
FIG. 1 is a schematic view of a conductive composite according to an embodiment.

Hereinafter, embodiments will be described in detail, and may be readily performed by those who have common knowledge in the related art. However, this disclosure may be embodied in many different forms and is not construed as limited to the example embodiments set forth herein; rather, these embodiments are provided so that this disclosure will fully convey the scope of the disclosure to those skilled in the art. Thus, in some exemplary embodiments, well known technologies are not specifically explained to avoid ambiguous understanding of the present inventive concept. Accordingly, the exemplary embodiments are merely described below, by referring to the figures, to explain aspects of the present inventive concept. Expressions such as "at least one of," when preceding a list of elements, modify the entire list of elements and do not modify the individual elements of the list. Unless otherwise defined, all terms used in the specification (including technical and scientific terms) may be used with meanings commonly understood by a person having ordinary knowledge in the art to which this invention belongs. Further, unless explicitly defined to the contrary, the terms defined in a generally-used dictionary should be interpreted as having a meaning that is consistent with their meaning in the context of the relevant art and the present disclosure, and are not ideally or excessively interpreted. In addition, unless explicitly described to the contrary, the word "comprise" and variations such as "comprises" or "comprising", and the word "include" and variations such as "includes" or "including", when used in this specification, specify the presence of stated features, regions, integers, steps, operations, elements, and/or components, but do not preclude the presence or addition of one or more other features, regions, integers, steps, operations, elements, components, and/or groups thereof. Therefore, the above words will be understood to imply the inclusion of stated elements but not the exclusion of any other elements.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As stated above, unless specifically described to the contrary, a singular form includes a plural form.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In an embodiment, the term "diameter" refers to a length of a diameter when a circular shape is present, a length of a major axis when an oval shape is present, and a distance between the two farthest points when other amorphous shapes are present.

In an embodiment, the term "electromagnetic wave shield" refers to "electromagnetic wave reflection" to reflect an electromagnetic wave and return it, and the term "electromagnetic wave absorption" refers to absorbing a part of an electromagnetic wave by a fine surface current and making it extinct by grounding, heat energy emission, and the like.

Hereinafter, a structure of a conductive composite according to an embodiment is described referring to FIGS. 1 to 4.

FIG. 1 is a schematic view of a conductive composite according to an embodiment.

Referring to FIG. 1, a conductive composite 100 according to an embodiment includes a polymer matrix 110 including a microcellulose fiber 111 and a conductive nanomaterial dispersed in the polymer matrix 110.

In an embodiment, the polymer matrix 110 has a mesh-type structure, wherein two or more microcellulose fibers 111 are entangled three-dimensionally, and two or more pores are formed between the microcellulose fibers 111.

In an embodiment, the microcellulose fibers 111 may be a micro-scale fiber having a diameter of greater than or equal to about 1 micrometer (μm). The micro-scale cellulose fibers have a strong interaction with adjacent cellulose fibers due to a relatively large molecular weight compared to nanoscale cellulose fibers. That is, strong repulsive forces act between adjacent microcellulose fibers 111, and thus may be loosely entangled with wider intervals compared to nanocellulose fibers. On the contrary, relatively small repulsive forces act between the nanocellulose fibers, and thus the nanocellulose fibers may be closely entangled without intervals.

As such, as a molecular weight of a unit structure increases, a repulsive force between unit structures generally becomes stronger, which is referred to as an "excluded volume effect". The polymer matrix 110 according to an embodiment has a uniform pore distribution inside the polymer matrix 110 as well as the surface of the polymer matrix 110 due to the excluded volume effect.

In an embodiment, the microcellulose fiber 111 may have a diameter of, for example, about 1 μm to about 999 μm, or for example about 1 μm to about 990 μm.

While not wishing to be bound by theory, it is understood that when the diameter of the microcellulose fiber 111 is within the above ranges, a uniform pore distribution inside the polymer matrix 110 as well as the surface of the polymer matrix 110 due to the excluded volume effect may be realized, and an assembled layer which will be described later may be formed in the cellulose fiber 111 inside the polymer matrix 110.

The microcellulose fiber 111 may have a length of, for example, greater than or equal to about 50 μm, for example greater than or equal to about 100 μm, for example greater than or equal to about 200 μm, for example greater than or equal to about 1,000 μm, or for example about 1,000 μm to about 1 centimeter (cm). While not wishing to be bound by theory, it is understood that when the length of the microcellulose fiber 111 is within the above ranges, a uniform pore distribution inside the polymer matrix 110 as well as the surface of the polymer matrix 110 due to the excluded volume effect may be realized, and an assembled layer which will be described later may be formed in the cellulose fiber 111 inside the polymer matrix 110.

In an embodiment, porosity of the polymer matrix 110 due to the excluded volume effect may be, for example, greater than or equal to about 20%, for example about 20% to about 90%, for example about 20% to about 80%, for example about 20% to about 70%, for example about 20% to about 65%, for example about 30% to about 65%, or for example about 40% to about 65%. While not wishing to be bound by theory, it is understood that when the porosity of the polymer matrix 110 is within the above ranges, light weight of the polymer matrix 110 relative to the same volume may be efficiently realized.

The polymer matrix 110 may be an assembled structure of the cellulose fibers 111 wherein two or more microcellulose fibers 111 are not woven in a predetermined direction but are arranged in various directions. That is, for example, the polymer matrix 110 may be a cellulose fiber non-woven fabric.

If the cellulose fibers are woven to have a certain two-dimensional or three-dimensional arrangement or two or more cellulose fibers are woven to form a woven fabric using two or more yarns arranged in the same direction, sufficient spaces between adjacent cellulose fibers may not formed, and thus porosity of the polymer matrix may be remarkably reduced.

Particularly, when the pores inside such a polymer matrix are not present, cellulose fibers arranged to have directivity are interlocked with each other, the conductive nanomaterial is prevented from being dispersed inside the polymer matrix, and the cellulose fiber 111 inside the polymer matrix 110 may not form an assembled layer which will be described later.

The polymer matrix 110 according to an embodiment has a structure where the microcellulose fibers 111 are arranged not to have certain directivity, and thereby the conductive nanomaterial may be readily dispersed inside the polymer matrix.

In an embodiment, the conductive nanomaterial may be dispersed through all regions from the surface to inside of the polymer matrix 110. The conductive nanomaterial may have a nanoscale of several nanometers to tens of nanometers, and two or more microcellulose fibers 111 may be attached to the surface. That is, the conductive composite 100 may become a micro-nano complex of two or more microcellulose fibers 111 formed by two or more conductive nanomaterials.

In an embodiment, the conductive nanomaterial may include, for example, a metal nanowire. The metal nanowire may be made of silver, gold, platinum, palladium, cobalt, nickel, titanium, copper, tantalum, or tungsten, or alloys of the foregoing metals.

A diameter of the metal nanowire may be, for example, about 1 nm to about 80 nm, for example about 1 nm to about 50 nm, or for example about 1 nm to about 30 nm.

While not wishing to be bound by theory, it is understood that when the diameter of the metal nanowire is within the above ranges, micro-nano complex between the microcellulose fiber and the metal nanowire may be readily realized.

Meanwhile, a conductive nanomaterial according to an embodiment may include a carbon nanotube, a graphene nanoparticle, a carbon nanofiber, carbon black, or a combination thereof, in addition to the metal nanowire.

In an embodiment, for example, the carbon nanotube may be a single-walled carbon nanotube (SWNT), a multi-walled carbon nanotube (MWNT), or a combination thereof.

A diameter of the carbon nanotube may be, for example, about 1 nm to about 80 nm, for example about 1 nm to about 70 nm, for example about 1 nm to about 50 nm, for example about 1 nm to about 30 nm, or for example about 1 nm to about 20 nm. While not wishing to be bound by theory, it is understood that when the diameter of the carbon nanotube is within the above ranges, the carbon nanotube has a similar size with that of the metal nanowire, which is clustered together with the metal nanowire, and may form a micro-nano complex between the microcellulose fiber-(metal nanowire, carbon nanotube) together with the metal nanowire.

The carbon nanotube has a smaller density than the metal nanowire and has conductivity at a certain level, and thus the conductive composite 100 may desirably become light-weighted. As the metal nanowire has more improved conductivity than the carbon nanotube, conductivity and EMI shield performance of the conductive composite 100 may be desirably improved.

Therefore, the amounts of the carbon nanotube and the metal nanowire may be varied according to the intended uses of the conductive composite 100, and a conductive composite 100 having improved conductivity and EMI shielding effectiveness as well as a relatively low density may be provided.

The carbon nanotube and the metal nanowire may be simply mixed and attached on the microcellulose fiber 111, or may form a stack structure having two or more different and separate layers, but is not limited thereto.

As an example of the micro-nano complex, the assembled layer 120 of two or more clustered conductive nanomaterials may surround the surface of the microcellulose fiber 111 as shown in FIG. 1. The assembled layer 120 surrounds the surface of the microcellulose fiber 111 and is simultaneously electrically connected to other assembled layers 120 surrounding the surface of other adjacent cellulose fibers 111. Accordingly, the conductive composite 100 according to an embodiment has conductivity and EMI shield characteristics.

The assembled layer 120 may be formed through all regions from the surface to the inside of the polymer matrix 110. Accordingly, when a direction having a wide area of the surface of the polymer matrix 110 is referred to as a plane direction, and a direction perpendicular to the plane is referred to as a thickness direction, the polymer matrix 110 may have conductivity and EMI shield characteristic in both plane and thickness directions.

In an embodiment, the assembled layer 120 may have a density gradient where it is gradually decreased from the surface of the polymer matrix 110 to the inside of the polymer matrix 110. That is, the conductive nanomaterial is present in a large amount on the surface of the polymer matrix 110, and is gradually decreased toward the inside of the polymer matrix 110. Accordingly, a thickness of the assembled layer 120 may also be gradually decreased from the surface of the polymer matrix 110 to the inside of the polymer matrix 110, as shown in FIG. 1.

Figure 2:
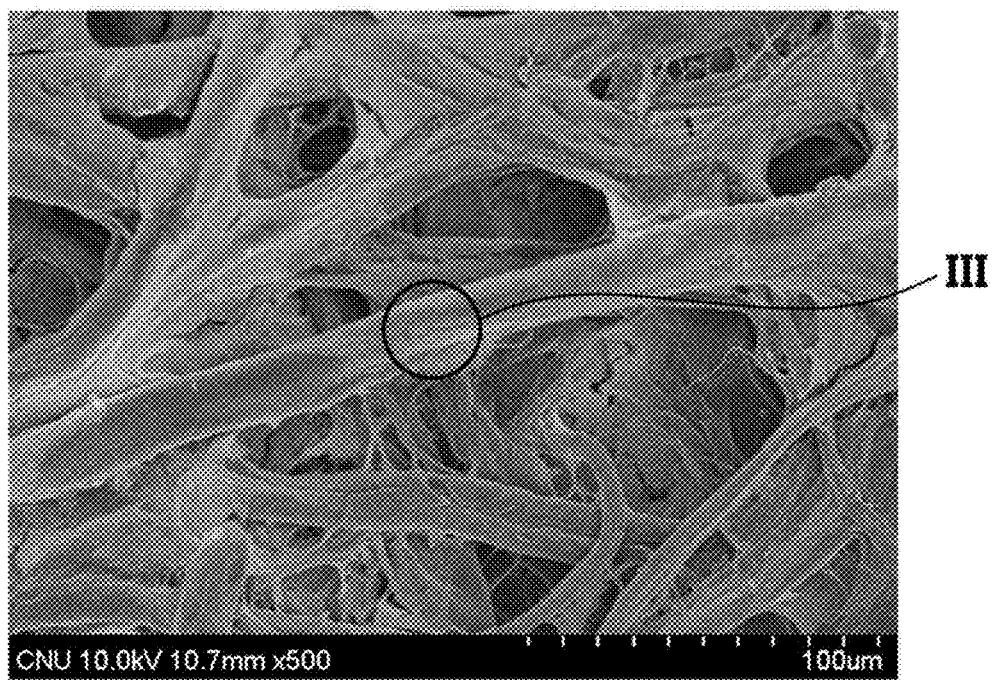
FIG. 2 is an image showing a surface of a conductive composite according to an embodiment.
Figure 3:
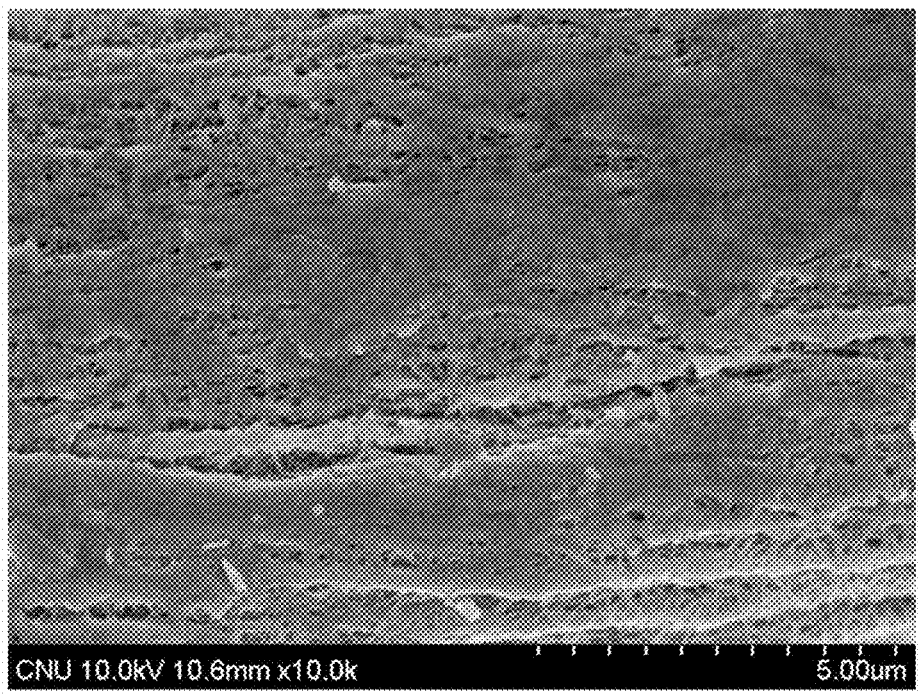
FIG. 3 is an image enlarging segment III of FIG. 2.

FIG. 2 is an image showing a surface of a conductive composite according to an embodiment, and FIG. 3 is an image enlarging segment III of FIG. 2.

Referring to FIG. 2, the assembled layer covers the surface of the microcellulose fibers, and the microcellulose fibers may be loosely entangled to form two or more pores. Referring to FIG. 3, the two or more metal nanowires as a conductive nanomaterial are clustered to form an assembled layer.

Figure 4:
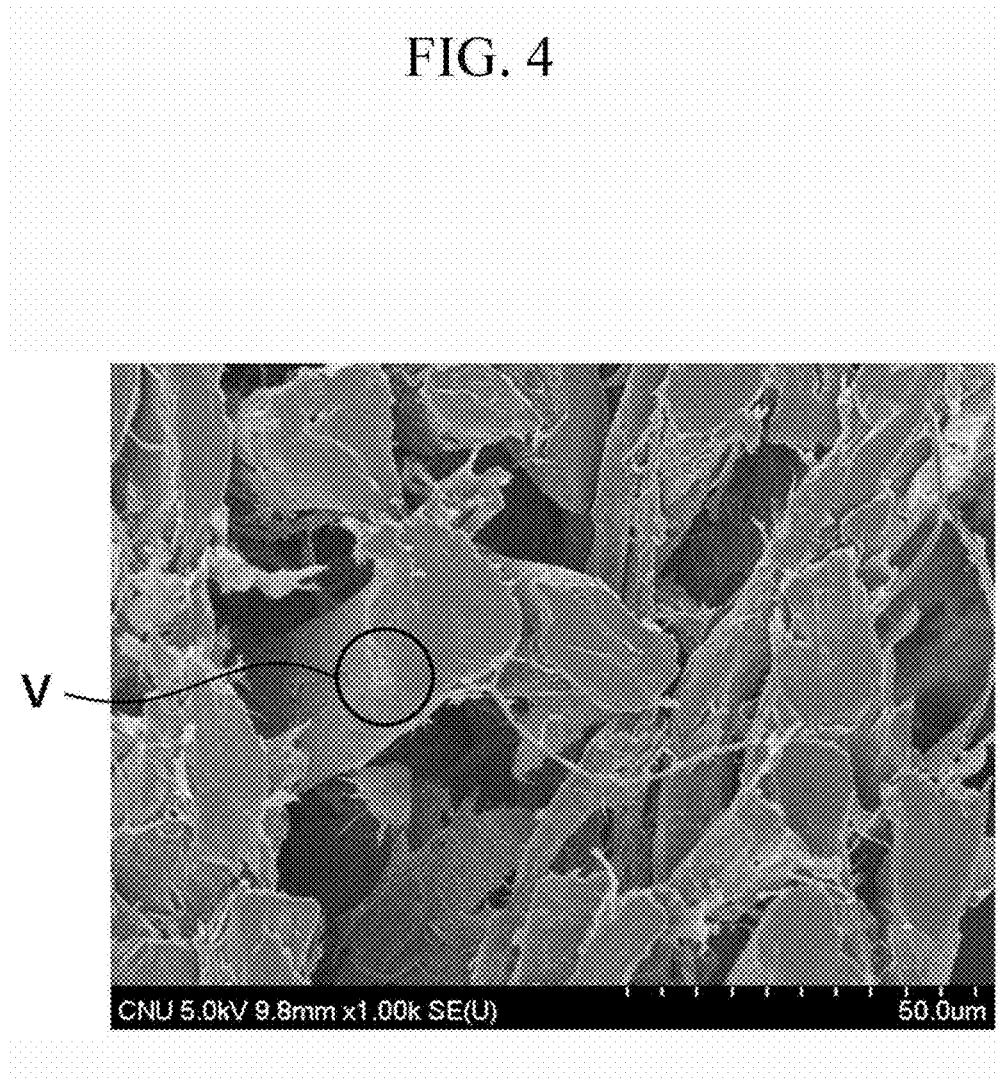
FIG. 4 is an image showing a surface of a conductive composite according to an embodiment.
Figure 5:
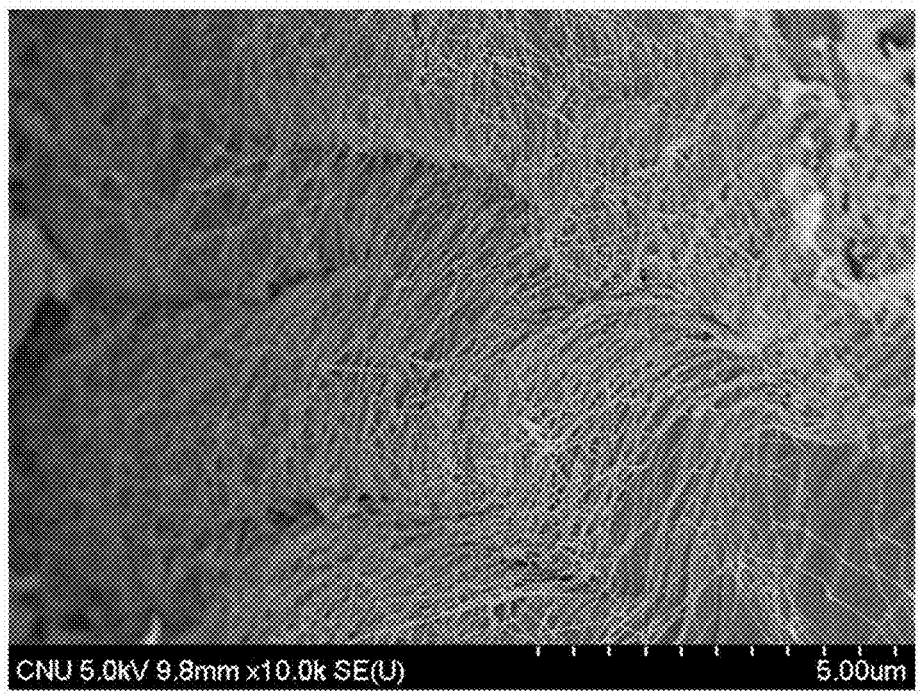
FIG. 5 is an image enlarging segment V of FIG. 4.

FIG. 4 is an image showing a surface of a conductive composite according to an embodiment, and FIG. 5 is an image enlarging segment V of FIG. 4.

Referring to FIG. 4, the assembled layer is uniformly distributed inside the polymer matrix, and referring to FIG. 5, two or more metal nanowires as a conductive nanomaterial are clustered on the surface of the microcellulose fiber to form an assembled layer.

FIGS. 3 and 5 are enlarged images at the same magnification, showing that a density of the assembled layer on the surface of the polymer matrix is larger than a density of the assembled layer inside the polymer matrix, and therefore, the assembled layer has a density gradient, according to which the density of the assembled layer is gradually decreased from the surface of the polymer matrix to the inside of the polymer matrix.

The conductive composite 100 of an embodiment has a gradual gradient of electromagnetic wave reflection in a thickness direction of the conductive composite 100 due to the density gradient, according to which the density of the assembled layer 120 is gradually decreased from the surface to the inside, as described above, and therefore an electromagnetic wave that enters into the conductive composite 100 may not be reflected by the assembled layer 120 directly and may be offset or become extinct inside the assembled layer 120. That is, electromagnetic waves flowing in a thickness direction may undergo offset interference by the electromagnetic wave reflection gradient of the conductive composite 100 and may become extinct.

That is, according to an embodiment, the conductive composite 100 may offset or remove electromagnetic waves through the electromagnetic wave reflection gradient, and thus may have improved EMI shielding effectiveness while having improved electromagnetic wave reflection and electromagnetic wave absorption.

However, the embodiment is not limited thereto, and may be designed as needed according to a use and a thickness of the conductive composite 100, a nature of a conductive nanomaterial, and a density of the assembled layer 120, and for example, the assembled layer 120 may be uniformly formed through all regions of the polymer matrix 110 without a density gradient.

In an embodiment, the conductive nanomaterial may be included in an amount of, for example, greater than or equal to about 0.001 percent by weight, for example greater than or equal to about 0.01 wt %, for example greater than or equal to about 0.1 wt %, or for example about 1 wt % to about 20 wt %, based on the total weight of the conductive composite 100.

In addition, the conductive nanomaterial may be present in an amount of, for example, greater than or equal to about 0.005 percent by volume, for example greater than or equal to about 0.01 vol %, for example about 0.01 vol % to about 0.1 vol %, for example about 0.01 vol % to about 0.80 vol %, for example about 0.01 vol % to about 0.60 vol %, or for example about 0.01 vol % to about 0.53 vol %, based on the total volume of the conductive composite 100.

While not wishing to be bound by theory, it is understood that when the conductive nanomaterial is included in the conductive composite 100 within the above ranges, the assembled layer 120 may surround the surface of the microcellulose fiber 111 through all regions of the polymer matrix 110 without significantly increasing a density of the conductive composite 100, and conductivity and EMI shielding effectiveness of the conductive composite 100 may be improved to a high level.

In an embodiment, a density of the conductive composite 100 may be, for example, less than or equal to about 0.65 g/cm$^3$, for example less than or equal to about 0.6 g/cm$^3$, or for example less than or equal to about 0.55 g/cm$^3$. In addition, in an embodiment, electro-conductivity of the conductive composite 100 may be, for example, greater than or equal to about 0.30 Siemens per centimeter (S/cm), for example greater than or equal to about 0.35 S/cm, or for example greater than or equal to about 0.40 S/cm.

That is, according to an embodiment, the conductive composite 100 has improved electro-conductivity and EMI shielding effectiveness while having a relatively low density.

As described above, a conductive composite 100 according to an embodiment includes a light-weighted polymer matrix while having a uniform internal pore distribution due to an excluded volume effect, an assembled layer of conductive nanomaterials is formed through a micro-nano complex between the cellulose fiber and the conductive nanomaterial in all regions of the polymer matrix, and thus the conductive composite 100 may have improved electro-conductivity and its EMI shielding effectiveness may be improved while having a relatively low density.

An electronic device according to another embodiment includes the conductive composite 100 according to an embodiment. The electronic device may be, for example, a mobile communication terminal such as a mobile phone, a PDA, or a tablet PC, home appliances and production facilities such as a PC, a monitor, a television, a refrigerator, an audio unit, a hair dryer, a cooking apparatus using electrical heat, or a heating apparatus, and large production facilities used through industries such as various production facilities.

An electronic device including the conductive composite 100 according to an embodiment improves EMI shielding effectiveness using a relatively light-weighted conductive composite 100, and improves EMI shield performance without an unnecessary weight increase.

However, uses of the conductive composite 100 according to an embodiment are not limited thereto, and the conductive composite 100 may be used in clothes, accessories, construction materials, office supplies, cars, and ships, and other applications commonly used in everyday life.

Hereinafter, referring to FIG. 6, a modification of an assembled layer 120 according to an embodiment is described.

Figure 6:
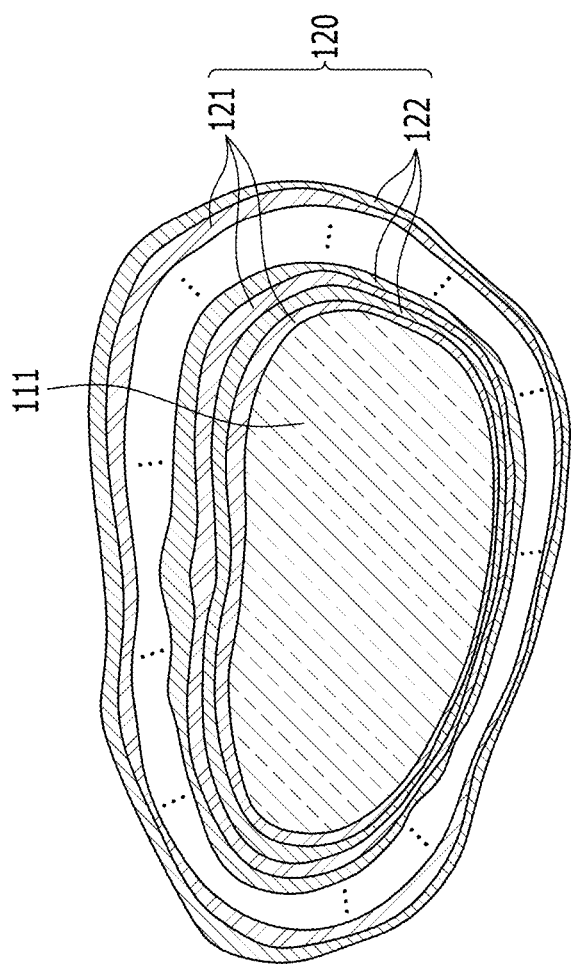
FIG. 6 is a schematic view of a modification of an assembled layer according to an embodiment.

FIG. 6 is a schematic view of a modification of an assembled layer according to an embodiment.

Referring to FIG. 6, an assembled layer 120 surrounds a surface of a microcellulose fiber 111, and a first layer 121 and a second layer 122 may be alternately stacked to form two or more layers.

The first layer 121 and the second layer 122 may include heterogeneous conductive nanomaterials. For example, when the first layer 121 is a layer of a clustered metal nanowire, the second layer 122 may be a layer of a carbon nanotube, a graphene nanoparticle, a carbon nanofiber, a carbon black, or a mixed clustered layer of the foregoing materials. The first layer 121 and the second layer 122 may be switched.

The first layer 121 and the second layer 122 may be, for example, alternately stacked once to five times, for example once to seven times, for example once to ten times, or for example once to twenty times.

As described above, density, electro-conductivity, and EMI shielding effectiveness of the conductive composite 100 may be easily controlled depending on a nature of the conductive nanomaterial, or a use of the conductive composite 100, by alternately stacking the heterogeneous conductive nanomaterials.

Hereinafter, a method of easily manufacturing a conductive composite 100 according to an embodiment is described.

Figure 7:
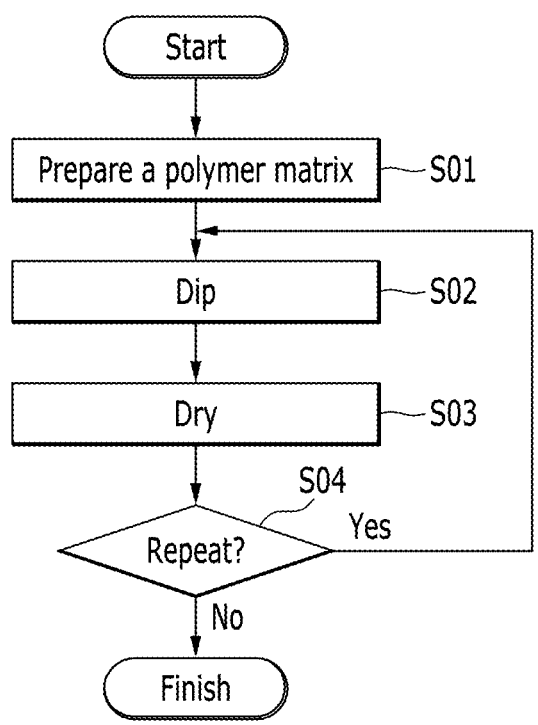
FIG. 7 is a flowchart showing a method of manufacturing a conductive composite according to an embodiment.

FIG. 7 is a flowchart showing a method of manufacturing a conductive composite according to an embodiment.

Referring to FIG. 7, a method of manufacturing the conductive composite according to an embodiment includes:
providing the polymer matrix (S01),
contacting the prepared polymer matrix in a conductive nanomaterial mixed solution (S02), and
drying the dipped polymer matrix (S03).

In the preparing of the polymer matrix (S01), the microcellulose fibers are three-dimensionally entangled and arranged in various directions to prepare the polymer matrix 110. The polymer matrix 110 may have lowered density due to relatively higher porosity and simultaneously uniform pore distribution through all regions from the surface to the inside as described above.

The conductive nanomaterial mixed solution may be separately prepared from the polymer matrix 110. The conductive nanomaterial mixed solution includes a conductive nanomaterial and a solvent, and may further include an additive for increasing a bonding force between the conductive nanomaterial and the microcellulose fiber.

As described above, the conductive nanomaterial may be a metal nanowire that is made of silver, gold, platinum, palladium, cobalt, nickel, titanium, copper, tantalum, or tungsten, or alloys including two or more foregoing metals.

The conductive nanomaterial may be a carbon nanotube, a graphene nanoparticle, a carbon nanofiber, carbon black, or a combination thereof, and may be a mixture of the carbon nanotube, graphene nanoparticle, carbon nanofiber, carbon black, or a combination thereof with the metal nanowire.

The solvent may be a hydrophilic solvent in which the conductive nanomaterial is uniformly dispersed, so that a bond between the microcellulose fiber and the conductive nanomaterial is readily formed. In an embodiment, the solvent may be, for example, water, or a hydrophilic organic solvent having a functional group such as an ether, an amine, an ester, an alcohol, and the like, but is not limited thereto.

The contacting may include a dipping process, but is not limited thereto. In the dipping process (S02), the prepared polymer matrix 110 is dipped in the conductive nanomaterial mixed solution. Accordingly, nanoscale conductive nanomaterials may be dispersed between pores of the dipped polymer matrix 110.

A dipping time of the polymer matrix 110 according to an embodiment may be variously selected according to the nature of a solvent and a conductive nanomaterial, an amount of the conductive nanomaterial mixed solution, a content of the conductive nanomaterial in the conductive nanomaterial mixed solution, and a volume of the polymer matrix 110. The dipping may be performed, for example, for greater than or equal to about 1 second (s), for example greater than or equal to about 3 s, for example greater than or equal to about 30 s, for example greater than or equal to about 1 minute (min), for example greater than or equal to about 3 min, for example greater than or equal to about 5 min, or for example greater than or equal to about 10 min.

While not wishing to be bound by theory, it is understood that when the dipping time of the polymer matrix 110 is within the above ranges, the conductive nanomaterials are not dispersed only on the surface of the polymer matrix 110, but may also be dispersed inside all regions.

Then, in the drying (S03), the dipped polymer matrix 110 is dried to evaporate solvent. Accordingly, the conductive nanomaterials dispersed in the polymer matrix 110 are fixed and combined through all regions from the surface to the inside of the polymer matrix 110.

That is, the conductive nanomaterials are attached to the surface of adjacent microcellulose fibers 111 through all regions of the polymer matrix 110 during the drying process to form a micro-nano complex. In addition, the two or more attached conductive nanomaterials are clustered to form an assembled layer 120 surrounding the surface of the microcellulose fiber 111.

The drying time, the drying temperature, and the drying method of the drying process may be selected according to the used solvent or the nature of the conductive nanomaterial.

The conductive composite 100 obtained by the drying process may include the assembled layer 120 through all regions from the surface to the inside, and the assembled layer 10 may have a density gradient, according to which the density of the assembled layer 10 is gradually decreased from the surface toward the inside.

The density gradient may be selected according to a dipping time of the polymer matrix 110, size of internal pores of the polymer matrix 110, internal pore distributions of the polymer matrix 110, a diameter of the conductive nanomaterial, a length of the conductive nanomaterial, and a conductive nanomaterial content in a conductive nanomaterial mixed solution.

A density of the assembled layer 120 is high on the surface of the polymer matrix 110, because in the dipping process, the conductive nanomaterial particles have a higher possibility of collision with the particles of the microcellulose fiber 111 distributed on the surface, rather than with the particles situated inside of the polymer matrix 110.

In an embodiment, the method may further include determining (S04) whether or not the dipping and drying are carried out repeatedly for the obtained conductive composite 100. The determining whether the repeated processes are performed (S04) may be set by electro-conductivity, EMI shielding effectiveness, and a porosity of the obtained conductive composite 100.

The conductive composite 100 may have various conductivities depending on the nature of a solvent and a conductive nanomaterial, an amount of the conductive nanomaterial mixed solution, a content of the conductive nanomaterial in the conductive nanomaterial mixed solution, and a volume of the polymer matrix 110. Therefore, when EMI shield performance at a certain level is desired according to a use of the conductive composite 100, the amount of the conductive nanomaterial inside the conductive composite 100 may be easily controlled by performing the dipping and drying process repeatedly.

In an embodiment, when an additional dipping and drying process of the conductive composite 100 is regarded as one unit cycle, the unit cycle may be, for example, once to 100 times, for example once to 80 times, for example once to 70 times, for example once to 60 times, or for example once to 50 times.

As described above, using the method of manufacturing the conductive composite according to an embodiment, a conductive composite 100 has relatively low density and is capable of readily achieving the desired EMI shield performance due to a porous polymer matrix.

Hereinafter, the present disclosure is illustrated in more detail with reference to examples. However, these examples are exemplary, and the present disclosure is not limited thereto.

EXAMPLES

Example 1: Manufacture of Cellulose-Silver Nanowire (AgNW) Composite

[1] Cellulose fibers having a diameter of about 1 micrometer (μm) to about 50 μm are three-dimensionally entangled in various directions to prepare a cellulose paper having a thickness of 160 μm and porosity of 63% to 66%.

[2] Separately, 0.1 wt % of silver nanowire (AgNW) is dispersed in an aqueous solution to prepare 1 liter (L) of a AgNW aqueous solution.

[3] The cellulose paper is dipped in a vessel including the 0.1 percent by weight (wt %) of the AgNW aqueous solution for 3 seconds (s) to disperse the AgNW through all regions of the cellulose paper. The dipped cellulose paper is recovered from the vessel and dried at a temperature of 60° C. while supplying dry air for 15 min to obtain a cellulose-AgNW composite. The composite has a shape where an AgNW assembled layer surrounds the surface of the cellulose fiber, and the AgNW has a density gradient where it is decreased from the surface to the inside.

Evaluation 1: Basic Properties of Example 1

[1] The dipping-drying unit cycle is performed 50 times for the composite of Example 1 under the same dipping and drying conditions as above. Herein, when the dipping-drying unit cycle is performed at 1st, 3rd, 5th, 10th, 20th, 30th, and 50th times, an apparent thickness, a thickness of the silver nanowire assembled layer formed on the surface of the composite, an apparent density, and a porosity of composites are measured and calculated, and the results are shown in Table 1.

[2] For comparison with Example 1, various properties of untreated cellulose paper in [1] of Example 1 are measured, and the results are shown in Table 1.

[3] Table 1 is as follows.

TABLE 1

| Repeated cycles (number of times) | Apparent thickness (μm) | Thickness of AgNW assembled layer formed on the surface of the composite (μm) | Apparent density (g/cm$^3$) | Porosity (%) |
|---|---|---|---|---|
| 1 | 156.5 ± 3.9 | 2.0 | 0.55 | 63.3 |
| 3 | 156.6 ± 3.6 | 2.1 | 0.53 | 65.0 |
| 5 | 157.7 ± 6.8 | 3.2 | 0.52 | 65.8 |
| 10 | 159.8 ± 2.9 | 5.3 | 0.52 | 65.6 |
| 20 | 161.3 ± 3.5 | 6.8 | 0.51 | 66.2 |
| 30 | 162.8 ± 4.9 | 8.3 | 0.54 | 64.8 |
| 50 | 164.2 ± 3.2 | 9.7 | 0.53 | 65.6 |
| NA (cellulose paper) | 154.5 ± 3.9 | NA | 0.54 | 64.3 |

In Table 1, NA denotes "Not Available".

In Table 1, the apparent density is a calculated value of a practical weight relative to the volume of the composite. In Table 1, the porosity is calculated according to Equation 1.

$$\text{Porosity} = \left(1 - \frac{\sigma_{ap}}{\sigma_{com}}\right) \times 100 \quad \text{Equation 1}$$

In Equation 1, $\sigma_{com}$ denotes a density of a composite when all pores inside a cellulose paper are filled with cellulose, and $\sigma_{ap}$ denotes an apparent density of Table 1.

During the $\sigma_{com}$ calculation process, a density of the cellulose and a density of AgNW are respectively assumed to be 10.49 grams per cubic centimeter (g/cm$^3$) and 1.50 g/cm$^3$.

[4] Referring to Table 1, as the number of repeated unit cycles increases, an apparent thickness of the composite is increased minutely and gradually. In addition, a deviation of a thickness is not large compared to a general cellulose paper.

Further, a thickness of the AgNW assembled layer formed on the surface of the composite has an increasing tendency as the number of repeated unit cycles increases, while apparent density is maintained at a certain level of 0.50 g/cm$^3$ to 0.56 g/cm$^3$. The reason is that a volume and practical weight of the composite are increased to a similar level as the number of repeated unit cycles increases. That is, even if a ratio of the AgNW assembled layer in the composite increases, the composite is determined to maintain density at a certain level.

Evaluation 2: Electrical Conductivity Characteristic of Example 1

[1] The dipping-drying unit cycle is performed 50 times for the composite of Example 1 under the same dipping and drying conditions as above. Herein, when the dipping-drying unit cycle is performed at 1st, 3rd, 5th, 10th, 20th, 30th, and 50th times, practical electro-conductivity (practical EC) in a plane direction of composites is measured while a voltage of 0.3 volts (V) to any two contacts on the same surface of composites is applied, and the results are shown in FIG. 8.

Figure 8:
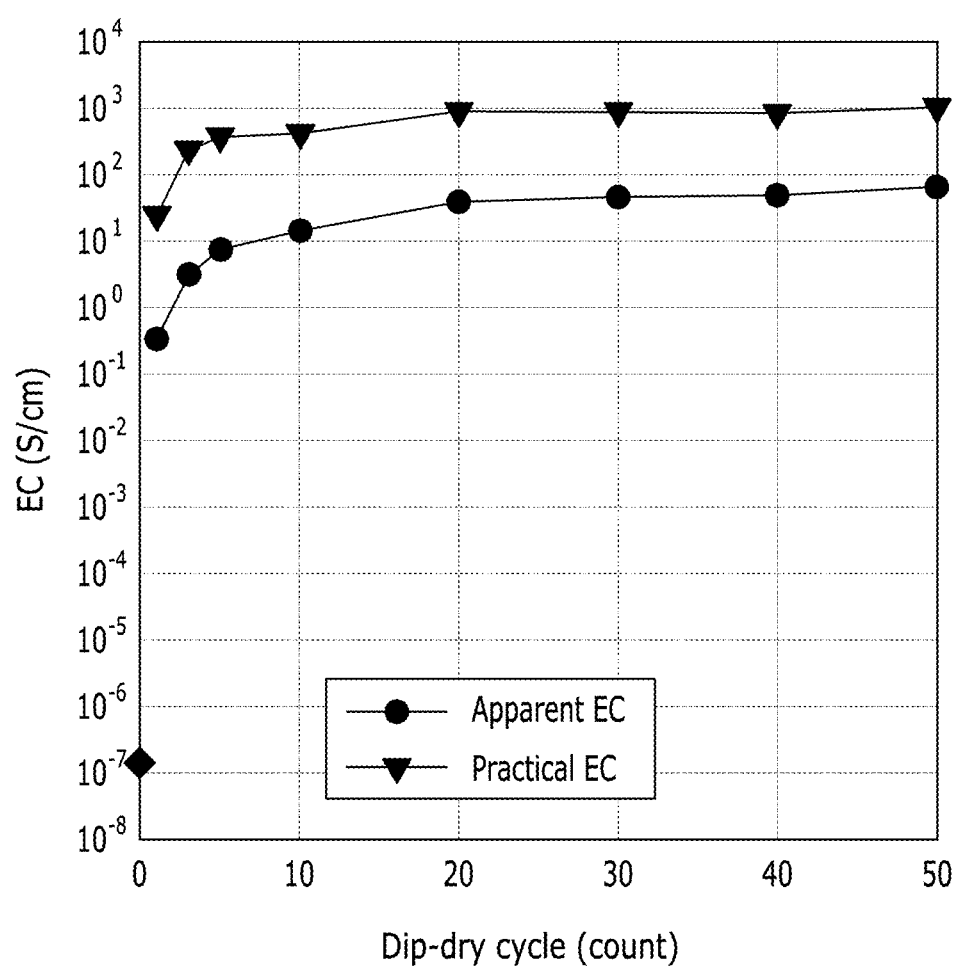

In addition, in Evaluation 1, apparent electro-conductivity (apparent EC) in a plane direction at each contact is calculated using the calculated apparent thickness and apparent density, and the results are shown FIG. 8.

Figure 9:
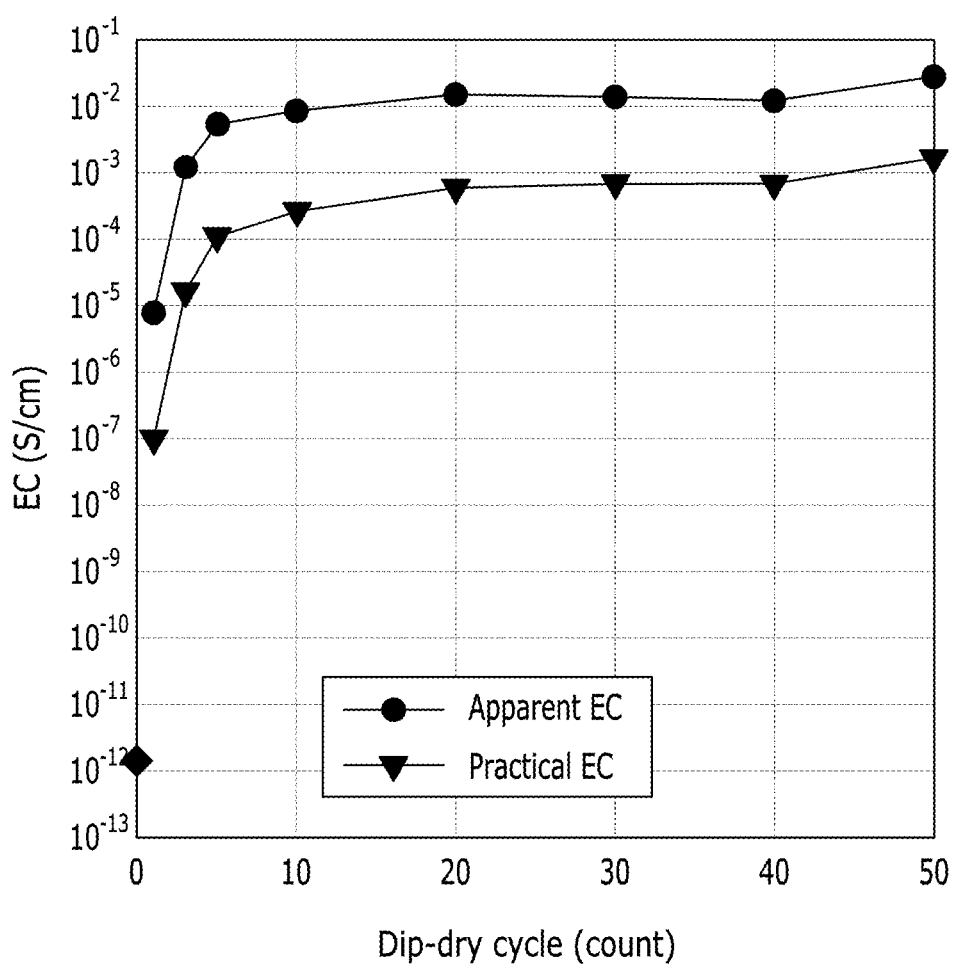

[2] When the dipping-drying unit cycle is performed at 1st, 3rd, 5th, 10th, 20th, 30th, and 50th times, practical electro-conductivity (practical EC) in a thickness direction of composites is measured while a voltage of 0.3 V to two contacts on the facing surface of composites is applied, and the results are shown in FIG. 9.

In addition, in Evaluation 1, apparent electro-conductivity (apparent EC) in a thickness direction at each contact is calculated using the calculated apparent thickness and apparent density, and the results are shown FIG. 9.

[3] For comparison with [1] and [2] of Evaluation 2, apparent electro-conductivity in a plane direction and a thickness direction of untreated cellulose paper in [1] of Example 1 is measured, and the results are shown with a diamond point in FIGS. 8 and 9.

[4] FIGS. 8 and 9 are graphs showing electro-conductivity according to the number of repeated dipping-drying unit cycles of a conductive composite according to an embodiment, wherein FIG. 8 shows electro-conductivity in a plane direction of the conductive composite, and FIG. 9 shows electro-conductivity in a thickness direction of the conductive composite.

[5] Referring to FIG. 8, the practical electro-conductivity (practical EC) in a plane direction of the composites is about 20 times to about 100 times higher than the apparent electro-conductivity (apparent EC), and as the repeated number of unit cycles increases, a deviation is gradually decreased from about 100 times to about 20 times.

The reason is that the AgNW has a density gradient that is gradually decreased from the surface to the inside of the composite.

In addition, as the repeated number of the unit cycles increases, the apparent electro-conductivity and the practical electro-conductivity are gradually increased and subsequently maintained at a certain level, and the composite has conductivity in a plane direction unlike the cellulose paper, which does not have actual conductivity (electro-conductivity of about $10^{-7}$ g/cm$^3$).

[6] Referring to FIG. 9, the apparent electro-conductivity (practical EC) in a thickness direction of the composites is about 20 times to about 100 times higher than the practical electro-conductivity (apparent EC), and as the repeated number of the unit cycles increases, a deviation is gradually decreased from about 100 times to about 20 times. The reason is that the AgNW has a density gradient that is gradually decreased from the surface to the inside of the composite.

In addition, as the repeated number of the unit cycles increases, the apparent electro-conductivity and the practical electro-conductivity are gradually increased and subsequently maintained at a certain level, and the composite has conductivity in a thickness direction unlike the cellulose paper, which does not have actual conductivity (electro-conductivity of about $10^{-12}$ g/cm$^3$).

Evaluation 3: EMI Shielding Effectiveness (SE) Characteristic of Example 1

[1] The dipping-drying unit cycle is performed 50 times for the composite of Example 1 under the same dipping and drying conditions as above. Herein, when the dipping-drying unit cycle is performed at 1st, 3rd, 5th, 10th, 20th, 30th, and 50th times, electromagnetic wave reflection (R), electromagnetic wave absorption (A), and electromagnetic wave transmittance (T) for an electromagnetic wave having frequency of 1.0 gigahertz (GHz) of composites are respectively measured, and the results are shown in FIG. 10.

Figure 10:
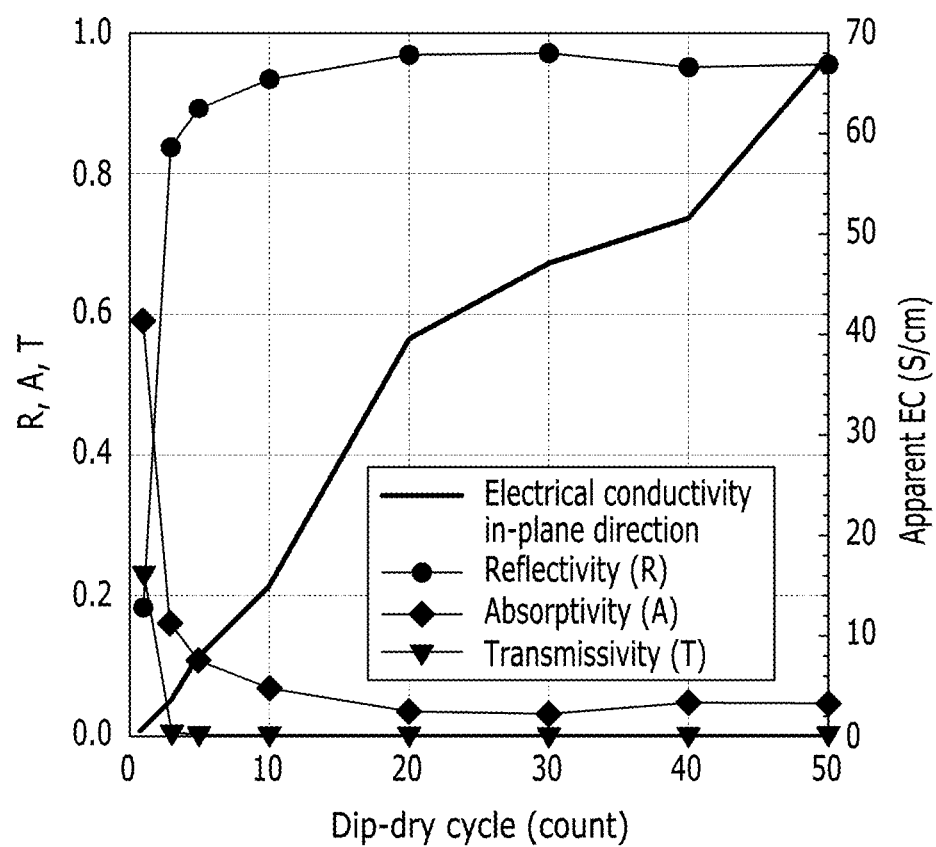
FIG. 10 is a graph of electro-conductivity EC (Siemens per meter, S/m) and normalized electromagnetic reflection (R), absorption (A), and transmittance (T) versus number of dip-dry cycles, showing relationships of electro-conductivity, electromagnetic wave reflection, electromagnetic wave absorption, and electromagnetic wave transmittance according to the number of repeated dipping-drying unit cycles of a conductive composite according to an embodiment.

For reference, apparent electro-conductivity (apparent EC) in a plane direction measured in Evaluation 2 is also shown in FIG. 10.

[2] FIG. 10 is a graph showing relationships of electro-conductivity, electromagnetic wave reflection, electromagnetic wave absorption, and electromagnetic wave transmittance according to the number of repeated dipping-drying unit cycles of a conductive composite according to an embodiment.

[3] Referring to FIG. 10, as the number of the dipping-drying unit cycles increases, apparent electro-conductivity (apparent EC) increases, and thus electromagnetic wave reflection is rapidly increased to converge at about 0.95 (about 95%). On the contrary, electromagnetic wave absorption decreases as electro-conductivity increases to converge at about 0.05 (about 5%). Meanwhile, as electro-conductivity increases, electromagnetic wave transmittance is rapidly decreased to be 0 (0%).

That is, electromagnetic wave reflection, electromagnetic wave absorption, and electromagnetic wave transmittance having a relation with EMI shielding effectiveness capability are dependent on apparent electro-conductivity (apparent EC) of composites, and it is expected that as apparent electro-conductivity (apparent EC) increases, and EMI shield performance will improve as the number of dipping-drying unit cycles increases.

Figure 11:
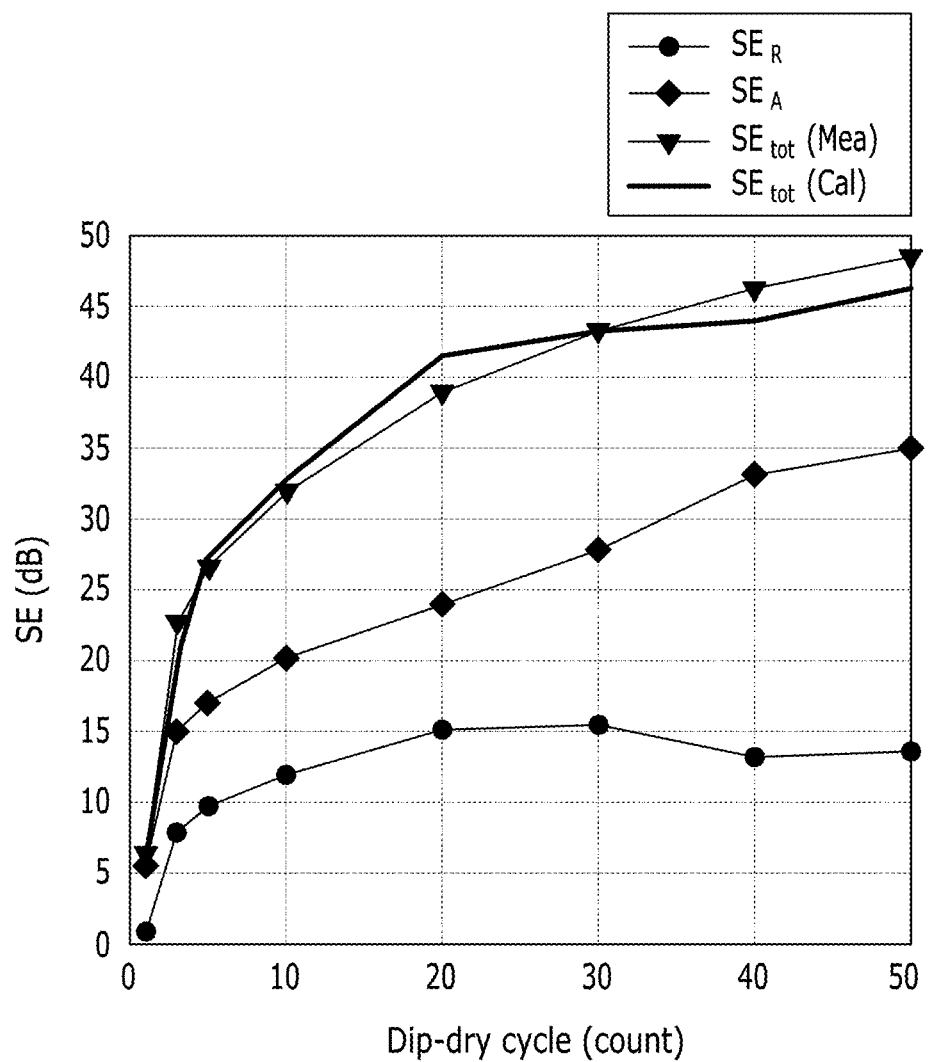
FIG. 11 is a graph of shielding effectiveness (decibel, dB) versus number of dip-dry cycles, showing EMI shielding effectiveness (SE) according to the number of repeated dipping-drying unit cycles of a conductive composite according to an embodiment.

[4] Meanwhile, when the dipping-drying unit cycle is performed at 1st, 3rd, 5th, 10th, 20th, 30th, and 50th times, electromagnetic wave absorption, electromagnetic wave reflection, and total EMI shielding effectiveness for an electromagnetic wave having a frequency of 1.0 GHz of composites are respectively measured, and the results are shown in FIG. 11. In addition, theoretical total EMI shielding effectiveness is calculated using apparent electro-conductivity (apparent EC) of the composites, and is shown in FIG. 11.

The theoretical total EMI shielding effectiveness is calculated by Equation 2.

$$SE_{tot}(Cal) = 20\log\left(1 + \frac{Z_0 t\sigma}{2}\right)$$ Equation 2

In Equation 2, $Z_0$ denotes impedance of air, $120\pi$ (Ohms, $\Omega$), t denotes a thickness of a composite, and $\sigma$ denotes apparent electro-conductivity of a composite.

[5] FIG. 11 is a graph showing EMI shielding effectiveness (SE) according to the number of repeated dipping-drying unit cycles of a conductive composite according to an embodiment. In FIG. 11, electromagnetic wave reflection of actually measured composites is denoted as $SE_R$, electromagnetic wave absorption of actually measured composites is denoted as $SE_A$, total EMI shielding effectiveness measurement values of the conductive composites obtained by adding the electromagnetic wave reflection to the electromagnetic wave absorption is denoted as $SE_{tot}$(Mea), and theoretical total EMI shielding effectiveness calculated using apparent electro-conductivity (apparent EC) is denoted as $SE_{tot}$(Cal).

[6] Referring to FIG. 11, as the number of repeated dipping-drying unit cycles increases, each electromagnetic wave reflection and electromagnetic wave absorption is gradually increased. Accordingly, the total EMI shielding effectiveness obtained by adding the electromagnetic wave reflection to the electromagnetic wave absorption is also gradually increased.

Meanwhile, the measurement value, $SE_{tot}$(Mea), and the theoretical value, $SE_{tot}$(Cal), exhibit EMI shielding effectiveness at a similar level, and when the dipping-drying cycle of conductive composites is repeated 50 times, EMI shielding effectiveness of about 48.6 decibel (dB) may be obtained.

Comparative Example 1: Manufacture of Cellulose-Multi-Walled Carbon Nanotube (MWNT) Composite

[1] 50 wt % of a bleached broadleaf tree kraft pulp and 50 wt % of a bleached needle-leaf kraft pulp are dispersed in water, and treated up to a beating degree of 500 milliliters (mL).

[2] Separately, 1% of multi-walled carbon nanotubes (Nanocyl S.A. (Nanocyl 7000)) having an average diameter of 10 nanometers (nm) and an average length of 1.5 μm is dispersed in an anionic surfactant to prepare a carbon nanotube dispersion liquid.

[3] The carbon nanotube dispersion liquid and 2% of a cationized starch adhesive aqueous solution (Neotack L-1, Nihon Shokuhin Kako Co., Ltd.) are added to the treated pulps, and dried to manufacture a cellulose-MWNT composite. In the cellulose-MWNT composite, the MWNT forms a network on the surface of the cellulose fiber.

The cellulose-MWNT composite has a thickness of 160 μm.

Figure 12:
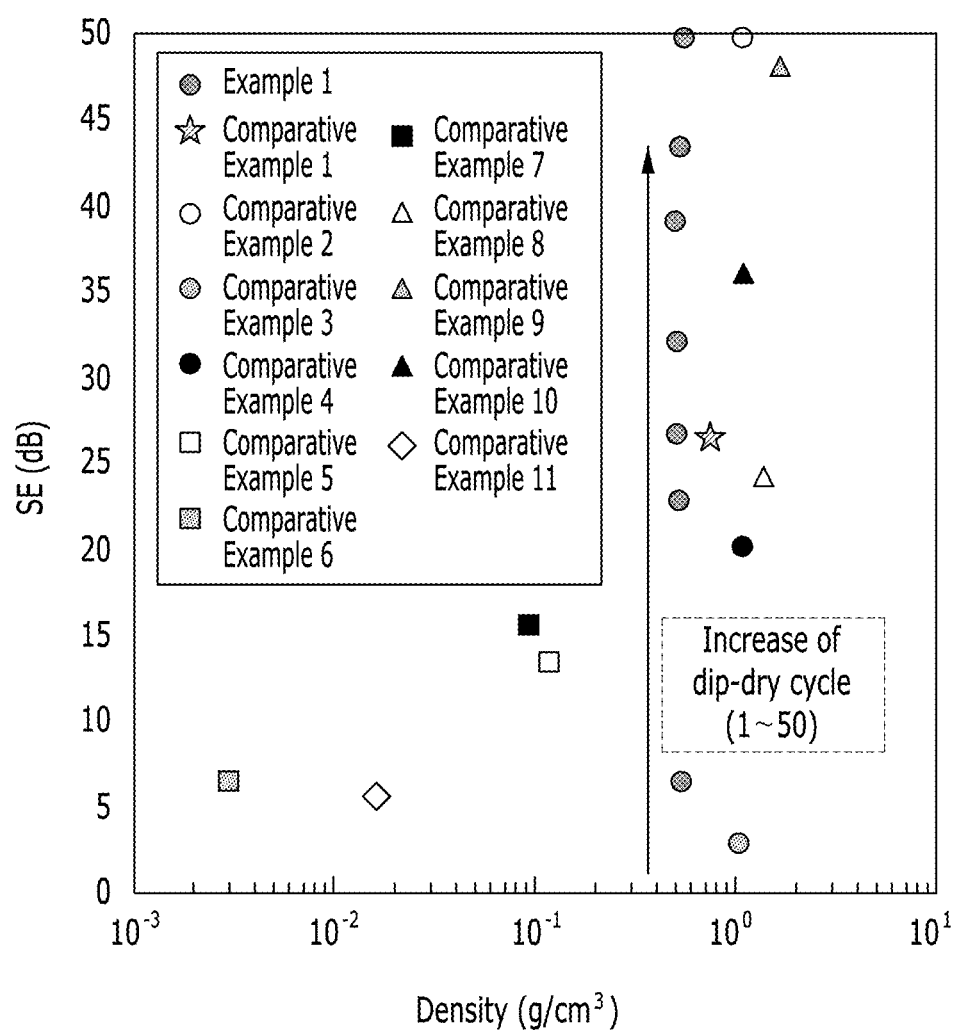
FIG. 12 is a graph of shielding effectiveness (decibel, dB) versus density (grams per cubic centimeter, g/cm$^3$) showing total EMI shielding effectiveness (measurement value) relative to an apparent density of conductive composites of Example 1 and Comparative Examples 1 to 11.

[4] Weight percent of the multi-walled carbon nanotube based on the total weight, apparent density of the composites, apparent electro-conductivity in a plane direction, penetration depth (skin depth) of electromagnetic waves having a frequency of 1.0 GHz, and total EMI shielding effectiveness (measurement value) for the electromagnetic waves of the cellulose-MWNT composites are respectively measured, and the results are shown in Table 2. In addition, the EMI shielding effectiveness (measurement value) relative to the measured apparent density is shown in FIG. 12.

Comparative Example 2: Manufacture of Rubber-MWNT Composite

[1] 30 milligrams (mg) of a single-walled carbon nanotube (SWNT) having a length of 1 mm, a diameter of 3 nm, and purity of 99.98% obtained by a super-growth method, 60 mg of an ionic liquid (1-butyl-3-methylimidazolium bis (trifluoromethanesulfonyl)imide, BMITFSI), and 20 mg of 4-methyl-2-pentanone are stirred at 20° C. using a magnetic stirrer at 700 revolutions per minute (rpm) or more for 16 hours (h).

[2] The stirred mixed solution is placed in a high pressure jet milling homogenizer (Nano-jel pal, JN10, Jokoh) and treated under a pressure of 60 megapascals (MPa) to obtain a black paste-like substance.

[3] The obtained paste-like substance is mixed with 80 mL of 4-methyl-2-pentanone and vinylidene fluoride-tetrafluoroethylene-hexafluoropropylene (having a weight of 50 to 1,500 mg) as a fluorine-addition polymer, and the mixture is stirred at 25° C. for 16 h, drop-cast on a glass plate, and dried for 6 h by using air to obtain a rubber-SWNT gel. The rubber-SWNT gel has viscosity of about 10 pascal-seconds (Pa·s). The rubber-SWNT gel is additionally dried for 12 h by using air to obtain a rubber-SWNT composite. The rubber-SWNT composite has a thickness of 160 μm.

[4] Weight percent of SWNT based on the total weight, apparent density of composites, apparent electro-conductivity in a plane direction, penetration depth (skin depth) of electromagnetic waves having a frequency of 1.0 GHz, and total EMI shielding effectiveness (measurement value) for the electromagnetic waves of the rubber-SWNT composite are respectively measured, and the results are shown in Table 2. In addition, the EMI shielding effectiveness (measurement value) relative to the measured apparent density is shown in FIG. 12.

Comparative Example 3: Manufacture of Epoxy-Single-Walled Carbon Nanotube (SWNT) Composite

[1] A polymer mixture is obtained by mixing a commercially available bisphenol A-type epoxy resin (618 type, Tianjin Resin Company) and an amine-containing hardener [$(C_{17}H_{31}CONH(C_2H_4NH)_2H)_2$] (Tianjin Ningping Chemical Co., LTD, MODEL: A022-2) in a ratio of 2:1.

[2] Separately, a SWNT suspension liquid is obtained by dispersing SWNT having a diameter of 1 nm to 2 nm in acetone in an ultrasonic wave cleaner at room temperature for 2 h.

[3] A polymer mixture and an acetone solution are added to the SWNT suspension liquid, and the mixture is stirred for 2 h and ultrasonicated. Then, a hardener is added thereto, while the mixture is mechanically stirred.

[4] The resultant is subsequently ultrasonicated for 15 minutes (min) and poured into a mold, and the acetone solution is completely volatilized to obtain an epoxy-SWNT composite. The epoxy-SWNT composite has a thickness of 160 μm.

[5] Weight percent of SWNT based on the total weight, apparent density of the composites, apparent electro-conductivity in a plane direction, penetration depth (skin depth) of electromagnetic waves having a frequency of 1.0 GHz, and total EMI shielding effectiveness (measurement value) for the electromagnetic waves of the epoxy-SWNT are respectively measured, and the results are shown in Table 2. In addition, the EMI shielding effectiveness (measurement value) relative to the measured apparent density is shown in FIG. 12.

Comparative Example 4: Manufacture of Polydimethylsiloxane (PDMS)-MWNT Composite

[1] In order to form a nanocomposite, polydimethylsiloxane (PDMS, Sylgard 184, Dow Corning Company) and a multi-walled carbon nanotube (MWNT, Hanwha Nanotech Inc.) having a diameter of 10 nm to 20 nm and a length of 50 μm to 200 μm are respectively prepared.

[2] Then, an elastomer matrix and a hardener are mixed at a weight ratio of 10:1, and MWNT is further mixed for 1 min to prepare a MWNT paste. The MWNT paste is pre-stirred using a paste mixer (Daehwa Tech, PDM-1k), and then intervals between rolls are gradually reduced while milling the paste for several minutes using a three-roll milling method (three roll mill, Torrey Hills Tech).

[3] The roll-milled MWNT paste is then cured, and thereby a PDMS-MWNT composite including the MWNT combined with the PDMS matrix is manufactured. The PDMS-MWNT composite has a thickness of 160 μm.

[4] Weight percent of MWNT based on the total weight, apparent density of composites, apparent electro-conductivity in a plane direction, penetration depth (skin depth) of electromagnetic waves having a frequency of 1.0 GHz, and total EMI shielding effectiveness (measurement value) for the electromagnetic wave of the PDMS-MWNT composite are respectively measured, and the results are shown in Table 2. In addition, the EMI shielding effectiveness (measurement value) relative to the measured apparent density is shown in FIG. 12.

Comparative Example 5: Aerogel-Like Carbon

[1] Skins and joints of sugar cane are extracted from stems of commercially available sugar cane. The extracted materials are chopped into minute pieces and placed in an autoclave that is made of TEFLON (tetrafluoroethylene)-treated stainless steel material. The autoclave is heated to heat-treat the materials at 180° C. for 1 h under a naturally generated pressure, and the treated carbonaceous sugar cane samples are dipped in water heated at about 80° C. for 10 h to remove foreign particles therefrom.

[2] The samples having no foreign particles are freeze-dried to obtain an aerogel-type carbon intermediate. The obtained aerogel-type carbon intermediate is placed in a tube furnace and thermally decomposed at 800° C. for 1 h under an $N_2$ atmosphere to manufacture an aerogel-type carbon. The aerogel-type carbon has a thickness of 160 μm.

[3] Apparent density of composites, apparent electro-conductivity in a plane direction, penetration depth (skin depth) of electromagnetic waves having a frequency of 1.0 GHz, and total EMI shielding effectiveness (measurement value) for the electromagnetic waves of the aerogel-type carbon are respectively measured, and the results are shown in Table 2. In addition, the EMI shielding effectiveness (measurement value) relative to the measured apparent density is shown in FIG. 12.

Comparative Example 6: Manufacture of Thermally Decomposed Bacterial Cellulose Aerogel-PDMS Composite

[1] A bacterial cellulose thin coating including about 1% of fiber is formed by using coconut milk and *Acetobacter xylinum* in a sucrose environment.

[2] The bacterial cellulose thin coating is cut into a square or a rectangle, frozen with −196° C. liquefied nitrogen, and lyophilized by using a bulk tray drier at −48° C. under 0.04 millibars (mbar) to obtain a bacterial cellulose aerogel.

[3] The obtained bacterial cellulose aerogel is thermally decomposed by using liquid argon at a temperature of 600° C. to 1,450° C. to obtain a black ultra-light thermally decomposed bacterial cellulose aerogel. A fiber inside the thermally decomposed bacterial cellulose aerogel has a diameter of several nanometers to several tens of nanometers.

[4] The obtained PDMS pre-polymer is permeated thereinto to obtain a composite intermediate. The composite intermediate is mixed with a silicon elastomer (Sylgard 184, Dow Corning Company) as a hardener, and the mixture is degassed for 2 h. The resultant is thermally cured at 70° C. for 1 h to obtain a thermally decomposed bacterial cellulose aerogel-PDMS composite. The thermally decomposed bacterial cellulose aerogel-PDMS composite has a thickness of 160 μm.

[5] Apparent density of composites, apparent electro-conductivity in a plane direction, penetration depth (skin depth) of electromagnetic waves having a frequency of 1.0 GHz, and total EMI shielding effectiveness (measurement value) for the electromagnetic waves of the thermally decomposed bacterial cellulose aerogel-PDMS composite are respectively measured, and the results are shown in Table 2. In addition, the EMI shielding effectiveness (measurement value) relative to the measured apparent density is shown in FIG. 12.

Comparative Example 7: Manufacture of Cellulose Aerogel-MWNT Composite

[1] The multi-walled carbon nanotubes are ultrasonicated and dispersed in distilled water by using a cationic surfactant (cetyltrimethylammonium bromide, CTAB) within an output of 325 watts (W) for 15 min. The CTAB and the MWNT are present in a weight ratio of 0.8:1.0, and the MWNT is uniformly dispersed in distilled water to form a MWNT suspension liquid.

[2] Then, 7 g of NaOH and 12 g of urea are added to the MWNT suspension liquid and mixed therewith, and the mixture is pre-frozen to −12.0° C. Cellulose is immediately placed in the pre-frozen mixture, and the obtained mixture is stirred at 3,000 rpm for 5 min to obtain a MWNT/cellulose solution. The obtained MWNT/cellulose solution includes the cellulose in a weight ratio of 2.5 wt %.

[3] The MWNT/cellulose solution is then poured into a glass mold, gelated at 70° C. for 24 h, and immediately placed in a bath of distilled water at room temperature to form a cellulose composite hydrogel from which the NaOH and urea are removed.

[4] The cellulose composite hydrogel is rapidly frozen with liquefied nitrogen, placed in a lyophilizer (FD-1A-50, Boyikang Laboratory Instruments CO., LTD.) and lyophilized for 48 h to obtain a cellulose aerogel-MWNT composite. The cellulose aerogel-MWNT composite has a thickness of 160 μm and an internal cellulose network having a diameter of several nanometers to tens of nanometers.

[5] Apparent density of composites, apparent electro-conductivity in a plane direction, penetration depth (skin depth) of electromagnetic waves having frequency of 1.0 GHz, and total EMI shielding effectiveness (measurement value) for the electromagnetic waves of the cellulose aerogel-MWNT composite are respectively measured, and the results are shown in Table 2. In addition, the EMI shielding effectiveness (measurement value) relative to the measured apparent density is shown in FIG. 12.

Comparative Example 8: Manufacture of Epoxy-AgNW Composite

[1] According to a polyol method, ethylene glycol and silver nitrate are mixed with polyvinyl pyrrolidone and heated up to 170° C. to obtain AgNW. The AgNW has a diameter of 100 nm to 200 nm and a length of 10 μm to 15 μm. The prepared AgNW is dispersed in ethanol to obtain a AgNW suspension liquid.

[2] The AgNW suspension liquid is mixed with an epoxy resin (DGEBA type, NPEF-165, Nan-Ya Plastics Industrial Co.) to form a conductive paste. The conductive paste is adjusted to have viscosity of greater than or equal to 8,000 mPa. In addition, 3-aminopropyltriethoxysilane (APTES) is added thereto during the mixing to promote dispersion of the AgNW in the epoxy resin.

[3] The conductive paste is coated and cured to manufacture an epoxy-AgNW composite. The epoxy-AgNW composite has a thickness of 160 μm.

[4] Weight percent of the AgNW based on the total weight of the composites, apparent density of the composites, apparent electro-conductivity in a plane direction, penetration depth (skin depth) of electromagnetic waves having frequency of 1.0 GHz, and total EMI shielding effectiveness (measurement value) for the electromagnetic waves of the epoxy-AgNW composite are respectively measured, and the results are shown in Table 2. In addition, the EMI shielding effectiveness (measurement value) relative to the measured apparent density is shown in FIG. 12.

Comparative Example 9: Manufacture of Polyvinyl Alcohol-AgNW Composite

[1] According to a polyol method, ethylene glycol and silver nitrate are mixed with polyvinyl pyrrolidone and heated up to 170° C. to obtain AgNW. The AgNW has a diameter of 100 nm to 200 nm and a length of 10 μm to 15 μm. The prepared AgNW is dispersed in ethanol to obtain a AgNW suspension liquid.

[2] The AgNW suspension liquid is mixed with a polyvinyl alcohol resin (BF-15, Chang Chun Petrochemical Co.) to form a conductive paste. The conductive paste is adjusted to have viscosity of greater than or equal to 8,000 mPa. In addition, 3-aminopropyltriethoxysilane (APTES) is added thereto during the mixing to promote dispersion of the AgNW inside the polyvinyl alcohol resin.

[3] The conductive paste is coated and cured to manufacture a polyvinyl alcohol-AgNW composite. The polyvinyl alcohol-AgNW composite has a thickness of 160 μm.

[4], Weight percent of AgNW based on the total weight, apparent density of composites, apparent electro-conductivity in a plane direction, penetration depth (skin depth) of electromagnetic waves having frequency of 1.0 GHz, and total EMI shielding effectiveness (measurement value) for the electromagnetic wave of the polyvinyl alcohol-AgNW composite are respectively measured, and the results are shown in Table 2. In addition, the EMI shielding effectiveness (measurement value) relative to the measured apparent density is shown in FIG. 12.

Comparative Example 10: Manufacture of Polysilicon-Copper Nanowire (CuNW) Composite

[1] A porous aluminum oxide template, having pores with a diameter of 25 nm and a depth of 36 μm, is synthesized through an anodizing treatment. The depth of the pores may be adjusted through a time for the anodizing treatment.

[2] Then, a copper nanowire (CuNW) is formed on the surface of the pore of the template through an electrodeposition process. The template is then etched by using a 1 M NaOH aqueous solution to separate the CuNW from the template.

[3] The separated CuNW is placed in methanol and dispersed therein through ultrasonication to obtain a polycrystalline CuNW (diameter of 25 nm) suspension liquid having high purity.

[4] The CuNW suspension liquid is dried to obtain CuNW powder, the CuNW powder is placed in a polysilicon solution, and the mixture is stirred to obtain a polysilicon-CuNW mixed solution. The CuNW is surrounded and combined by the polysilicon molecules through a polymer-forming reaction to obtain an intermediate. After volatilizing a solvent from the intermediate, the residual intermediate is compressed and molded to manufacture a polysilicon-CuNW composite. The polysilicon-CuNW composite has a thickness of 160 μm.

[5] Weight percent of CuNW based on the total weight, apparent density of composites, apparent electro-conductivity in a plane direction, penetration depth (skin depth) of electromagnetic waves having a frequency of 1.0 GHz, and total EMI shielding effectiveness (measurement value) for the electromagnetic waves of the polysilicon-CuNW composite are respectively measured, and the results are shown in Table 2. In addition, the EMI shielding effectiveness (measurement value) relative to the measured apparent density is shown in FIG. 12.

Comparative Example 11: Manufacture of Polyimide Foam-AgNW Composite

[1] According to a polyol method, ethylene glycol and silver nitrate are mixed with polyvinyl pyrrolidone and heated up to 160° C. to obtain AgNW. The AgNW has an average diameter of 90 nm and an average length of 7.1 μm. The prepared AgNW is dispersed in ethanol to obtain a AgNW suspension liquid.

[2] Subsequently, a part of the AgNW is mixed with 100 pphp (parts per hundred parts) of anhydride by weight of N,N'-dimethyl formamide (DMF) and dispersed therein by using an ultrasonic wave disperser (a bath sonicator) for 60 min.

[3] The dispersed AgNW mixture is then placed in a 250 mL flask at 85° C. under an $N_2$ atmosphere. 100 pphp of 3,3',4,4'-benzophenone tetracarboxylic dianhydride (BTDA), 40 pphp of a processing aid such as methanol and silicone oil (DC-193, Foshan Daoning Chemical Co. Ltd.), polyethylene glycol 600 (PEG-600, Beijing Finechem.), or a combination thereof, and 13 pphp of deionized water are added to the AgNW mixture, and the obtained mixture is stirred for 2 h to obtain a first solution in which the AgNW is uniformly precipitated.

[4] The first solution is cooled down to 25° C., 200 pphp of polyaryl polymethylene isocyanate (PAPI, PM-200, Yantai Wanhua Polyurethanes Co. Ltd.) is further added thereto, and the mixture is stirred at a high speed of about 2,000 rpm for 5 seconds (s) to 15 s, immediately placed in a mold, and allowed to naturally develop free foaming for about 5 min.

[5] The foam is moved to a vacuum oven, and heated at 250° C. for 2 h to perform an imidization reaction to manufacture a polyimide foam-AgNW composite. The polyimide foam-AgNW composite has a thickness of 160 μm.

[6] Apparent density of composites, apparent electro-conductivity in a plane direction, penetration depth (skin depth) of electromagnetic waves having a frequency of 1.0 GHz, and total EMI shielding effectiveness (measurement value) for the electromagnetic waves of the polyimide foam-AgNW composite are respectively measured, and the results are shown in Table 2. In addition, the EMI shielding effectiveness (measurement value) relative to the measured apparent density is shown in FIG. 12.

Evaluation 4: Properties Evaluation of Example 1 and Comparative Examples 1 to 11

[1] FIG. 12 is a graph showing total EMI shielding effectiveness (measurement value) relative to an apparent density of conductive composites of Example 1 and Comparative Examples 1 to 11. As for Example 1, FIG. 12 shows sequential results when a dipping-drying unit cycle is repeated once, 3 times, 5 times, 10 times, 20 times, 30 times, and 50 times in an arrow direction.

[2] Table 2 is as follows.

TABLE 2

| | Amount of conductive material (wt %) | Apparent density (g/cm$^3$) | Apparent electro-conductivity (S/cm) | Penetration depth (μm) | Total EMI shielding effectiveness (dB) |
|---|---|---|---|---|---|
| Example 1 | 9.6 | 0.53 | 67.5 | 194 | 48.9 |
| Comparative Example 1 | 16.5 | 0.76 | 6.71 | 614 | 26.5 |
| Comparative Example 2 | 15.8 | 1.04 | 100.00 | 159 | 49.6 |
| Comparative Example 3 | 15.0 | 10.4 | 0.14 | 4250 | 3.1 |
| Comparative Example 4 | 10.0 | 1.05 | 3.00 | 1590 | 20.0 |
| Comparative Example 5 | NA | 0.12 | 1.33 | 1380 | 14.0 |
| Comparative Example 6 | NA | 0.003 | 0.40 | 2520 | 6.9 |
| Comparative Example 7 | NA | 0.095 | 1.80 | 1190 | 16.2 |
| Comparative Example 8 | 33.3 | 1.43 | 5.26 | 694 | 24.5 |
| Comparative Example 9 | 33.3 | 1.77 | 76.92 | 181 | 47.4 |
| Comparative Example 10 | 13 | 1.13 | 20.00 | 356 | 35.8 |
| Comparative Example 11 | NA | 0.017 | NA | NA | 5.4 |

In Table 2, NA denotes "Not Available".

[3] Referring to Table 2 and FIG. 12, Example 1 exhibits remarkably improved total EMI shielding effectiveness as well as maintains apparent density of about 0.54 g/cm$^3$ when the dipping-drying unit cycle is repeated up to 50 times. In particular, when the dipping-drying unit cycle is repeated about 30 times and 50 times, excellent apparent density and total EMI shielding effectiveness are obtained.

[4] In addition, Example 1 shows considerably excellent apparent electro-conductivity and penetration depth (skin depth) of electromagnetic waves having a frequency of 1.0 GHz compared to the comparative examples.

[5] Meanwhile, Comparative Example 2 including 15.8 wt % of SWNT having a diameter 2 nm to 3 nm and a length of several millimeters shows the highest total EMI shielding effectiveness, apparent electro-conductivity, and penetration depth of 49.6 dB, 100 Siemens per centimeter (S/cm), and 159 μm, respectively, and Comparative Example 9 shows high results of 47.4 dB, 76.92 S/cm, and 181 μm, respectively.

Comparative Examples 2 and 9 all have relatively high density of greater than 1 g/cm$^3$. Example 1 shows a similar total EMI shielding effectiveness to those of Comparative Examples 2 and 9, but a half of apparent density compared to Comparative Example 2, and only a third of apparent density compared to Comparative Example 9.

Accordingly, Example 1 exhibits an improved total EMI shielding effectiveness capability relative to apparent density in contrast with Comparative Examples 2, 3, 4, 8, 9, and 10. In other words, Example 1 shows excellent EMI shielding effectiveness capability despite low density in contrast with the comparative examples.

[6] Meanwhile, Comparative Examples 5, 6, 7, and 11 have very low density compared to Example 1, but significantly low apparent electro-conductivity and penetration depth, and thus low EMI shielding effectiveness. The reason is that a conductivity network is difficult to internally form as density becomes extremely low.

Example 2: Manufacture of Cellulose-MWNT-AgNW Composite

[1] The same cellulose paper as in [1] of Example 1 is prepared.

[2] Separately, 1 g of a multi-walled carbon nanotube (MWNT) having a diameter of 1 nm to 20 nm and 1 L of water are placed in a vessel and mixed to obtain 0.1 wt % MWNT ink.

[3] The prepared cellulose paper is dipped in a first vessel having the 0.1 wt % MWNT ink for 10 min to 15 min to disperse the MWNT through all regions of the cellulose paper. The dipped cellulose paper is taken from the first vessel, and dried by supplying 60° C. dry air for 15 min to obtain a cellulose-MWNT composite. The composite has a shape in which a MWNT assembled layer surrounds the surface of the cellulose fiber and a density gradient in which the MWNT gradually decreases from the surface to the inside.

[4] The cellulose-MWNT composite is dipped in a second vessel having the 0.1 wt % AgNW aqueous solution prepared in [2] of Example 1 for 10 min to 15 min, taken from the second vessel, and exposed to 60° C. dry air for 15 min to obtain a cellulose-MWNT-AgNW composite. The cellulose-MWNT-AgNW composite includes the MWNT assembled layer surrounding the surface of the cellulose fiber and the AgNW assembled layer surrounding the MWNT assembled layer.

Figure 18:
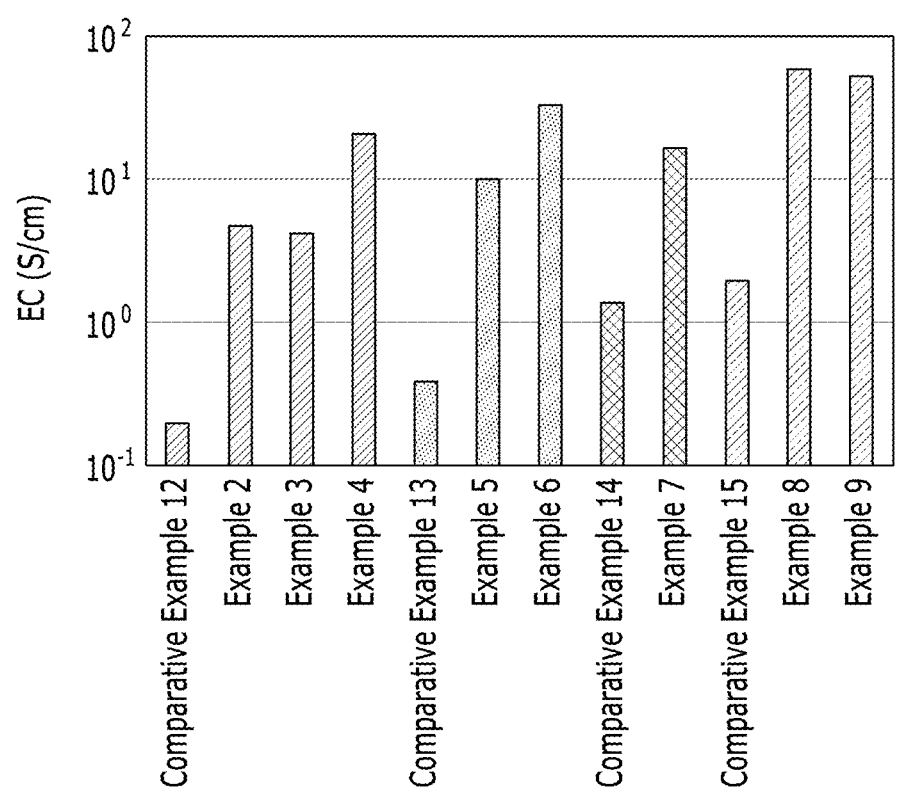
FIG. 18 is a diagram showing electro-conductivity (EC) (Siemens per meter, S/m) of the conductive composites according to Examples 2 to 9 and Comparative Examples 12 to 15.
Figure 19:
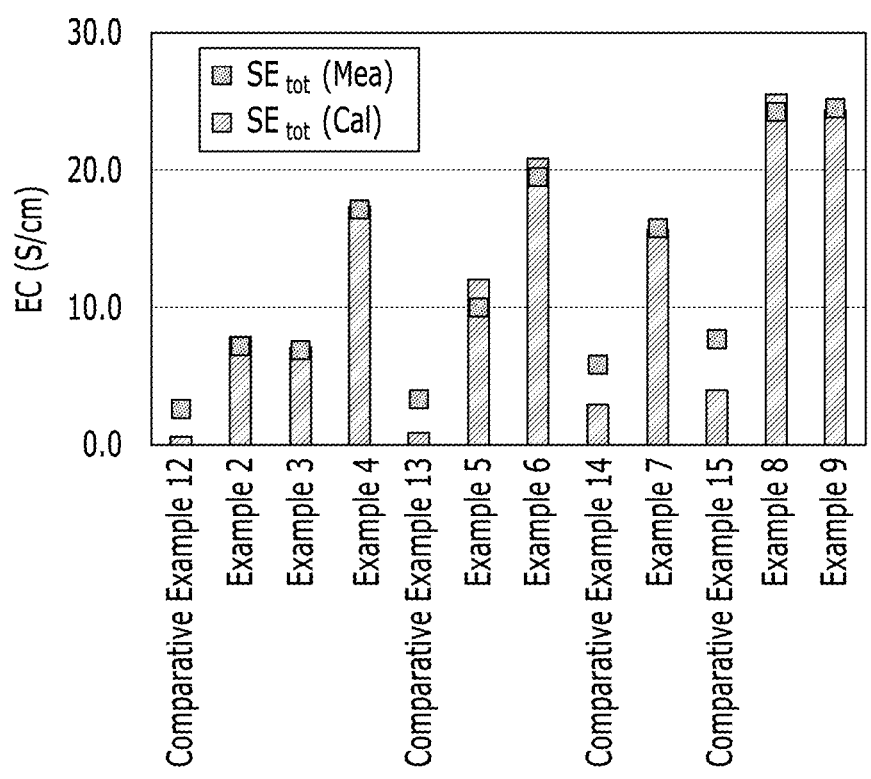
FIG. 19 is a diagram showing EMI shielding effectiveness (SE) (Siemens per meter, S/m) of the conductive composites according to Examples 2 to 9 and Comparative Examples 12 to 15.

[5] Subsequently, apparent electro-conductivity in a plane direction of the prepared cellulose-MWNT-AgNW composite is calculated and is shown in FIG. 18, EMI shielding effectiveness (measurement value) for electromagnetic waves having a frequency of 1.0 GHz of composites is measured, and the results are shown in FIG. 19.

Example 3: Manufacture of Cellulose-AgNW-MWNT Composite

[1] A cellulose-AgNW composite is obtained by performing dipping and drying processes as in Example 1.

[2] The cellulose-AgNW composite is dipped in a vessel having the MWNT ink according to Example 2 and dried to obtain a cellulose-AgNW-MWNT composite.

The cellulose-AgNW-MWNT composite includes two layers of an AgNW assembled layer surrounding the surface of a cellulose fiber and a MWNT assembled layer surrounding the AgNW assembled layer.

[3] FIG. 18 shows apparent electro-conductivity in a plane direction of the prepared cellulose-AgNW-MWNT composite, and FIG. 19 shows EMI shielding effectiveness (measurement value) of a composite with respect to an electromagnetic wave having a frequency of 1.0 GHz.

Example 4: Manufacture of Cellulose-AgNW-MWNT-AgNW Composite

[1] A cellulose-AgNW-MWNT composite is obtained by the same process as in Example 3.

[2] The cellulose-AgNW composite is dipped in a vessel filled with the MWNT ink obtained from Example 2, and a cellulose-AgNW-MWNT composite is obtained through the dipping and drying processes.

The obtained cellulose-AgNW-MWNT composite includes two layers of an AgNW assembled layer surrounding the surface of the cellulose fiber and a MWNT assembled layer surrounding the AgNW assembled layer.

[3] The apparent electro-conductivity in a plane direction of the cellulose-AgNW-MWNT composite is then calculated, and the results are shown in FIG. 18. EMI shielding effectiveness (measurement value) of the composite for electromagnetic wave having a frequency of 1.0 GHz is measured, and the results are shown in FIG. 19.

Example 4: Manufacture of Cellulose-AgNW-MWNT-AgNW Composite

[1] A cellulose-AgNW-MWNT composite is obtained by the same process as in Example 3.

[2] The cellulose-AgNW-MWNT composite is dipped in a second vessel filled with the 0.1 wt % AgNW aqueous solution obtained from Example 1 and dried to obtain a cellulose-AgNW-MWNT-AgNW composite. The obtained cellulose-AgNW-MWNT-AgNW composite includes 3 layers of an AgNW assembled layer, a MWNT assembled layer, and an AgNW assembled layer which are sequentially formed on the surface of the cellulose fiber.

[3] Apparent electro-conductivity in a plane direction of the obtained cellulose-AgNW-MWNT-AgNW composite is then calculated, and the results are shown in FIG. 18. EMI shielding effectiveness (measurement value) of the composite for an electromagnetic wave having a frequency of 1.0 GHz is measured, and the results are shown in FIG. 19.

Example 5: Manufacture of Cellulose-MWNT-AgNW-MWNT Composite

[1] A cellulose-MWNT-AgNW composite is obtained by the same process as in Example 2.

[2] The cellulose-MWNT-AgNW composite is dipped in a vessel filled with the 0.1 wt % MWNT aqueous solution obtained from Example 2 and dried to obtain a cellulose-MWNT-AgNW-MWNT composite. The obtained cellulose-MWNT-AgNW-MWNT composite includes 3 layers of a MWNT assembled layer, an AgNW assembled layer, and a MWNT assembled layer which are sequentially formed on the surface of the cellulose fiber.

[3] Apparent electro-conductivity in a plane direction of the obtained cellulose-MWNT-AgNW-MWNT composite is then calculated, and the results are shown in FIG. 18. EMI shielding effectiveness (measurement value) of the composite for an electromagnetic wave having a frequency of 1.0 GHz is measured, and the results are shown in FIG. 19.

Example 6: Manufacture of Cellulose-AgNW-MWNT-AgNW-MWNT-AgNW Composite

[1] The cellulose-AgNW-MWNT-AgNW composite obtained from Example 4 is dipped in a second vessel filled with the 0.1 wt % MWNT aqueous solution obtained from Example 2 and dried, and subsequently dipped in a first vessel filled with 0.1 wt % AgNW aqueous solution obtained from Example 1 and dried to obtain a cellulose-AgNW-MWNT-AgNW-WWNT-AgNW composite having a 5-layered structure in which an AgNW assembled layer, a MWNT assembled layer, an AgNW assembled layer, a MWNT assembled layer, and an AgNW assembled layer are sequentially formed on the surface of the cellulose fiber.

[2] Then the obtained cellulose-AgNW-MWNT-AgNW-WWNT-AgNW composite is measured for each plane by taking cross-sectional images using a scanning electron microscope (SEM), and the results are shown in FIGS. 13 to 17.

Figure 13:
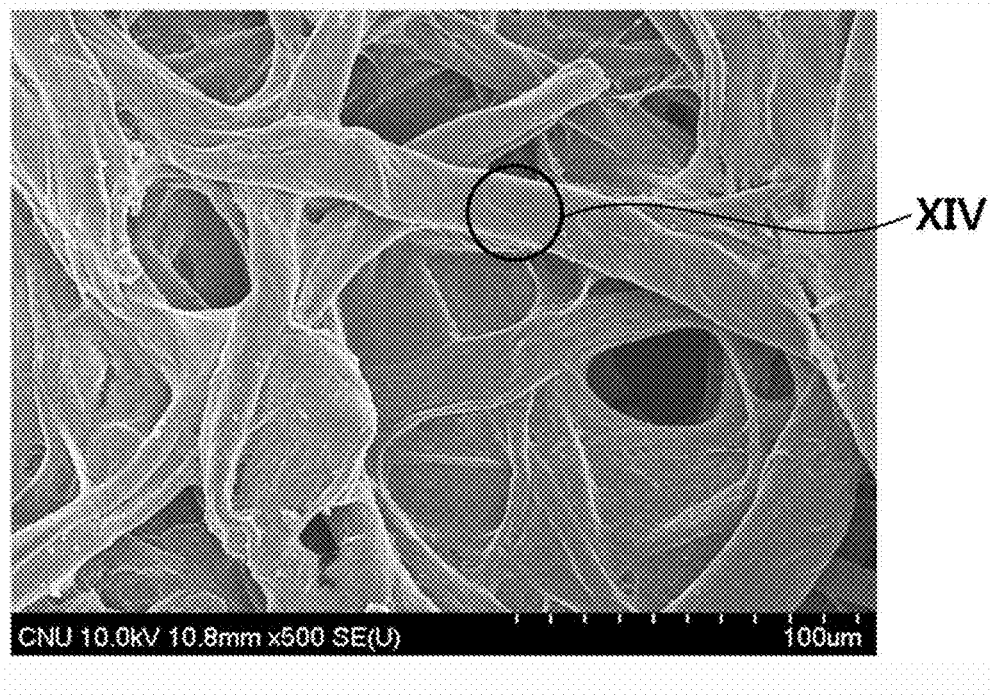
FIG. 13 is an image showing a surface of the cellulose-AgNW-MWNT-AgNW-MWNT-AgNW composite according to Example 6.
Figure 14:
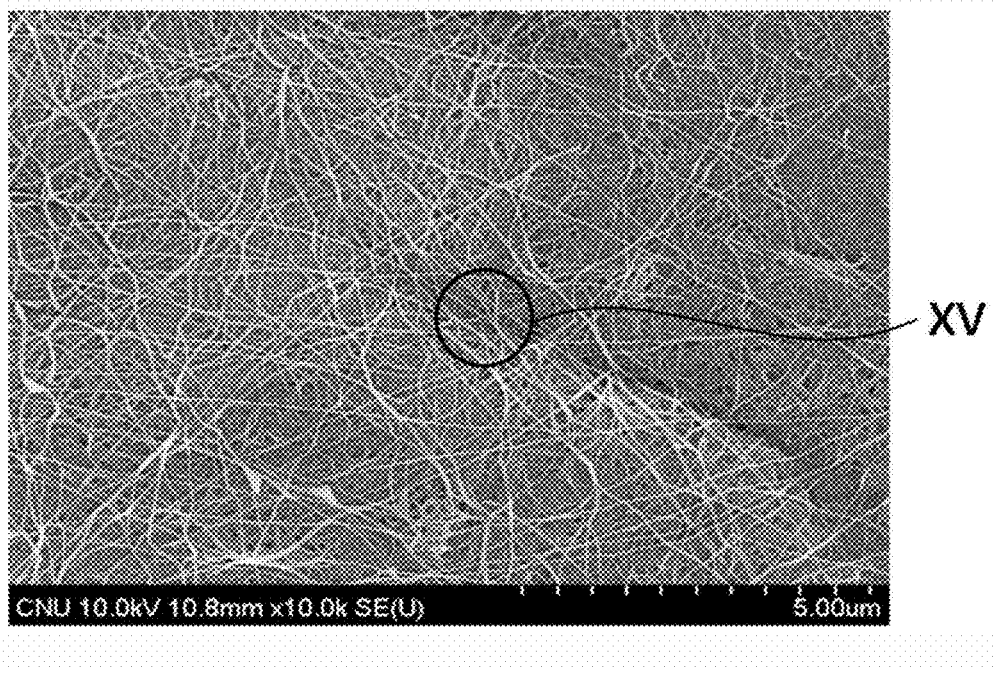
FIG. 14 is an image enlarging segment XIV of FIG. 13.
Figure 15:
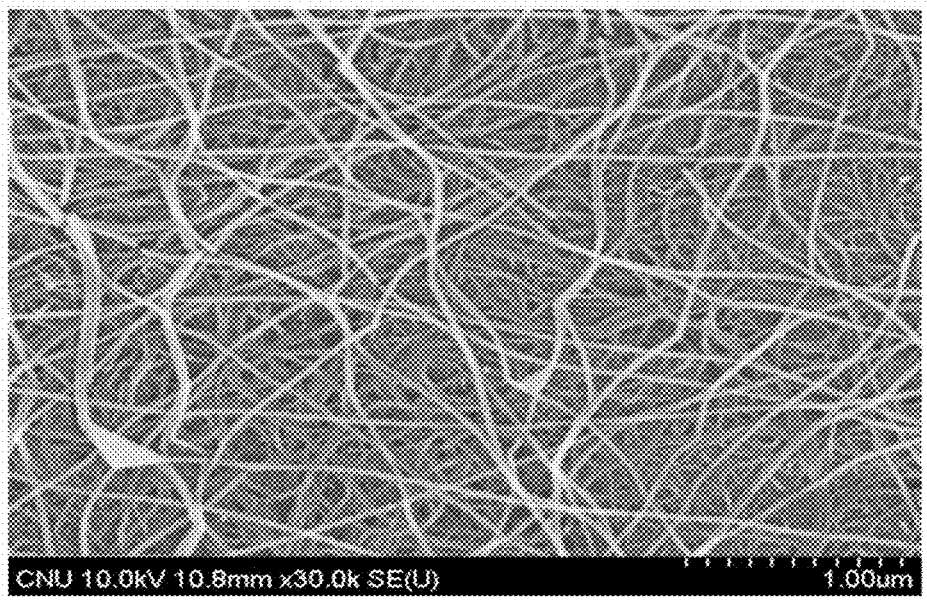
FIG. 15 is an image enlarging segment XV of FIG. 14.

[3] FIG. 13 is an image showing a surface of the cellulose-AgNW-MWNT-AgNW-MWNT-AgNW composite according to Example 6, FIG. 14 is an image enlarging an XIV portion of FIG. 13, and FIG. 15 is an image enlarging an XV portion of FIG. 14.

[4] The composite of Example 6 has an AgNW assembled layer on the outmost thereof, which is shown in an assembly of white lines having a relatively straight line shape in FIG. 14. Furthermore, as shown in FIG. 15 further enlarging FIG. 14, it is confirmed that the MWNT assembled layer in which two or more MWNT coiled in such a way that a vine assembly is formed on the lower part of the upper AgNW assembled layer extended in a relatively straight line shape.

Figure 16:
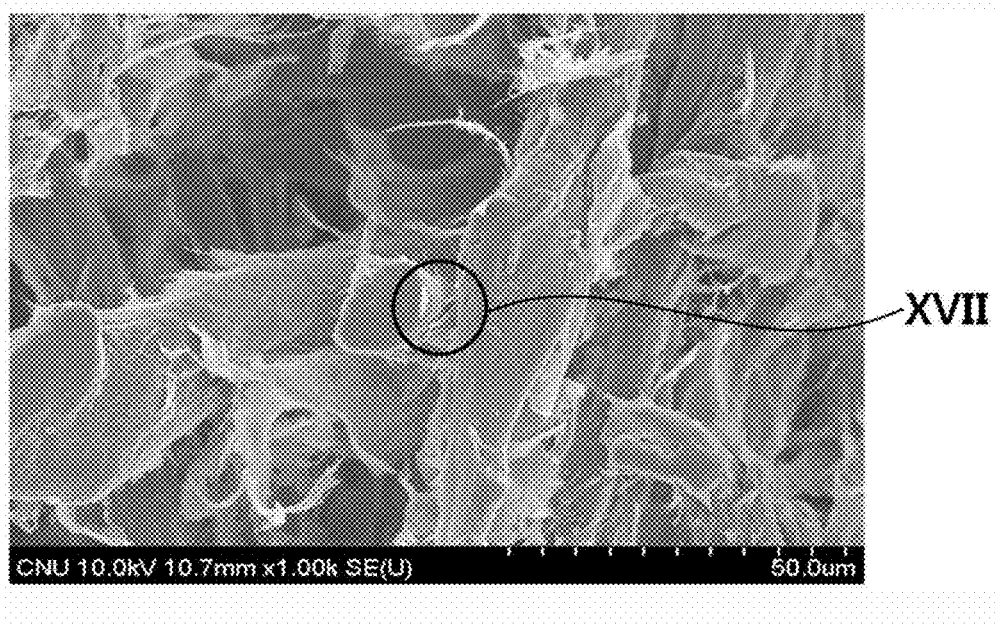
FIG. 16 is an image showing a cross-section of the cellulose-AgNW-MWNT-AgNW-MWNT-AgNW composite according to Example 6.
Figure 17:
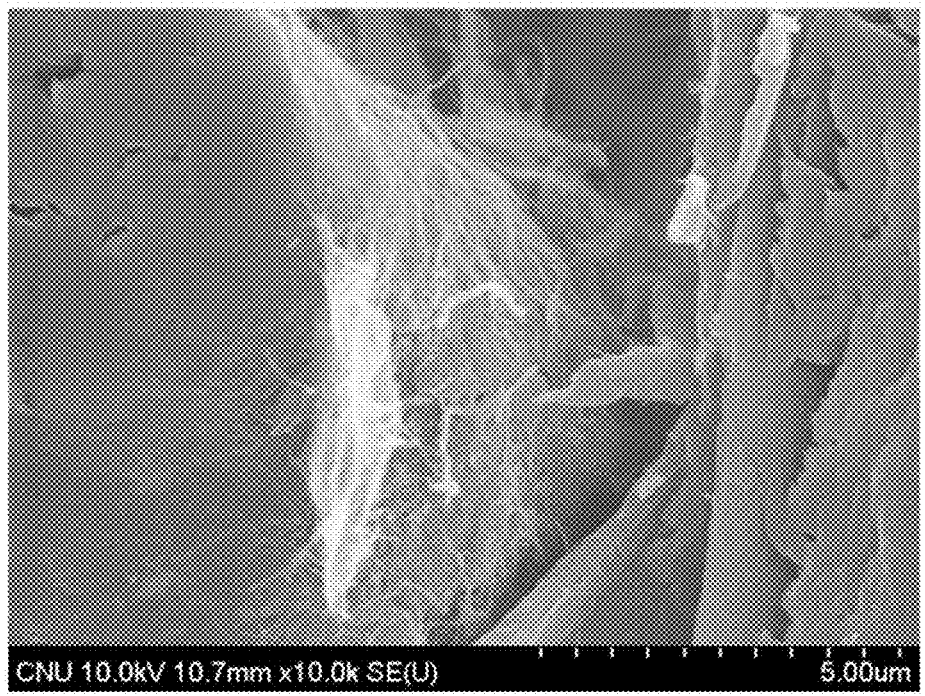
FIG. 17 is an image enlarging segment XVII of FIG. 16.

[5] FIG. 16 is an image showing a cross-section of the cellulose-AgNW-MWNT-AgNW-MWNT-AgNW composite according to Example 6, and FIG. 17 is an image enlarging an XVII portion of FIG. 16.

[6] As shown in FIG. 16 and FIG. 17, it is confirmed that the AgNW assembled layer and the MWNT assembled layer are placed in a hybridization state on the surface of microcellulose fiber in the cellulose paper obtained from Example 6.

[7] Apparent electro-conductivity in a plane direction of the obtained cellulose-AgNW-MWNT-AgNW-WWNT-AgNW composite is calculated, and the results are shown in FIG. 18. EMI shielding effectiveness (measurement value) of the composite for an electromagnetic wave having a frequency of 1.0 GHz is measured, and the results are shown in FIG. 19.

Example 7: Manufacture of Cellulose-MWNT-AgNW-MWNT-AgNW-MWNT Composite

[1] The cellulose-MWNT-AgNW-MWNT composite obtained from Example 5 is dipped in a first vessel filled with a 0.1 wt % AgNW aqueous solution obtained from Example 1 and dried, and then dipped in a second vessel filled with a 0.1 wt % MWNT aqueous solution obtained from Example 2 and dried to obtain a cellulose-MWNT-AgNW-MWNT-AgNW-MWNT composite having a structure of 5 layers in which a MWNT assembled layer, an AgNW assembled layer, a MWNT assembled layer, an AgNW assembled layer, and a MWNT assembled layer are sequentially formed on the surface of the cellulose fiber.

[2] Then, apparent electro-conductivity in a plane direction of the obtained cellulose-MWNT-AgNW-MWNT-AgNW-MWNT composite is calculated, and the results are shown in FIG. 18. EMI shielding effectiveness (measurement value) of the composite for an electromagnetic wave having a frequency of 1.0 GHz is measured, and the results are shown in FIG. 19.

Example 8: Manufacture of Cellulose-10 Layered (MWMT, AgNW) Composite 1

[1] The cellulose-MWNT-AgNW-MWNT-AgNW-MWNT composite obtained from Example 7 is alternately dipped in the AgNW aqueous solution and the MWNT aqueous solution and dried, and the processes are repeated to obtain a cellulose 10-layered (MWMT, AgNW) Composite 1. The obtained cellulose 10-layered (MWMT, AgNW) Composite 1 has a structure of a total of 10 layers alternately stacked in the order of "MWNT assembled layer-AgNW assembled layer . . . " as described above on the surface of the cellulose fiber.

[2] Then, apparent electro-conductivity in a plane direction of the obtained cellulose-10-layered (MWMT, AgNW) Composite 1 is calculated, and the results are shown in FIG. 18. EMI shielding effectiveness (measurement value) of the composite for an electromagnetic wave having a frequency of 1.0 GHz is measured, and the results are shown in FIG. 19.

Example 9: Manufacture of Cellulose-10 Layered (AgNW, MWMT) Composite 2

[1] The cellulose-AgNW-MWNT-AgNW-MWNT-AgNW composite obtained from Example 6 is alternately dipped in the MWNT aqueous solution and the AgNW aqueous solution and dried, and the processes are repeated to obtain a cellulose 10-layered (AgNW, MWMT) Composite 2. The obtained cellulose 10-layered (AgNW, MWMT) Composite 2 has a structure of a total of 10 layers which are alternately stacked in the order such as "AgNW assembled layer-MWNT assembled layer . . . " on the surface of the cellulose fiber.

[2] Then, apparent electro-conductivity in a plane direction of the obtained cellulose 10-layered (AgNW, MWMT) Composite 2 is calculated, and the results are shown in FIG. 18. EMI shielding effectiveness (measurement value) of the composite for an electromagnetic wave having a frequency of 1.0 GHz is measured, and the results are shown in FIG. 19.

Comparative Example 12: Manufacture of Cellulose-MWNT Monolayered Composite

[1] The same cellulose paper as in [1] of Example 1 is prepared.

[2] Separately, 1 g of multi-walled carbon nanotubes (MWNT) having a diameter of 1 nm to 20 nm and 1 L of water are placed in a vessel and mixed to obtain a 0.1 wt % MWNT ink.

[3] The prepared cellulose paper is dipped in a first vessel filled with the 0.1 wt % MWNT ink for 10 min to 15 min to disperse MWNT through all regions of the cellulose paper. The dipped cellulose paper is taken out from the first vessel and dried by supplying dry air at a temperature of 60° C. for 15 min to obtain a cellulose-MWNT monolayer composite. The composite has a shape in which the MWNT assembled layer surrounds the surface of the cellulose fiber and has a density gradient in which the MWNT is gradually decreased from the surface to the inside.

[4] Subsequently, apparent electro-conductivity in a plane direction of the obtained cellulose-MWNT monolayer composite is calculated, and the results are shown in FIG. 18. EMI shielding effectiveness (measurement value) of the composite for an electromagnetic wave having a frequency of 1.0 GHz is measured, and the results are shown in FIG. 19.

Comparative Example 13: Manufacture of Cellulose-MWNT Double-Layered Composite

[1] The cellulose-MWNT monolayer composite obtained from Comparative Example 12 is dipped in the 0.1 wt % MWNT ink and dried once more to obtain a cellulose-MWNT double-layered composite.

[2] Then, apparent electro-conductivity in a plane direction of the obtained cellulose-MWNT double-layered composite is calculated, and the results are shown in FIG. 18. EMI shielding effectiveness (measurement value) of the composite for an electromagnetic wave having a frequency of 1.0 GHz is measured, and the results are shown in FIG. 19.

Comparative Example 14: Manufacture of Cellulose-MWNT Three-Layered Composite

[1] The cellulose-MWNT double-layered composite obtained from Comparative Example 13 is dipped in the 0.1 wt % MWNT ink and dried once more to obtain a cellulose-MWNT three-layered composite.

[2] Then, apparent electro-conductivity in a plane direction of the obtained cellulose-MWNT three-layered composite is calculated, and the results are shown in FIG. 18. EMI shielding effectiveness (measurement value) of the composite for an electromagnetic wave having a frequency of 1.0 GHz is measured, and the results are shown in FIG. 19.

Comparative Example 15: Manufacture of Cellulose-MWNT Five-Layered Composite

[1] The cellulose-MWNT three-layered composite obtained from Comparative Example 14 is dipped in the 0.1 wt % MWNT ink and dried twice more to obtain a cellulose-MWNT five-layered composite.

[2] Then, apparent electro-conductivity in a plane direction of the obtained cellulose-MWNT five-layered composite is calculated, and the results are shown in FIG. 18. EMI shielding effectiveness (measurement value) of the composite for electromagnetic wave having a frequency of 1.0 GHz is measured, and the results are shown in FIG. 19.

Evaluation 4: Electro-Conductivity of Examples 2 to 9 and Comparative Examples 12 to 15

[1] FIG. 18 is a graph showing electro-conductivity (EC) of the conductive composites according to Examples 2 to 9 and Comparative Examples 12 to 15.

[2] Referring to FIG. 18, it is understood that, compared to Comparative Example 12 of the cellulose-MWNT monolayer composite, Examples 2 to 4 including at least one AgNW assembled layer exhibit remarkably improved electro-conductivity.

Further, it is determined that Example 2, in which the AgNW assembled layer is formed in first the cellulose surface, exhibits slightly higher electro-conductivity than Example 3, in which the MWNT assembled layer is formed first. This is assumed to be because the contact resistance, when the AgNW assembled layer is formed outermost, is lower than the contact resistance when the MWNT assembled layer is formed outermost, when Example 2 and Example 3 have the same number of layers.

Example 4 including a two-layered AgNW assembled layer exhibits higher electro-conductivity compared to Examples 2 and 3. This is assumed to be caused by the fact that AgNW has higher conductivity than MWNT.

[3] Further, it is determined that, compared to Comparative Example 13 having a cellulose-MWNT two-layered composite, both Example 5 and Example 7 exhibit significantly improved electro-conductivity. It is also determined that, compared to Example 5 having only 1 layer of the AgNW assembled layer, the case of Example 6 having 2 AgNW assembled layers exhibits higher electro-conductivity.

[4] The cellulose-MWNT-AgNW-MWNT-AgNW-MWNT composite of Example 7 exhibits significantly improved electro-conductivity compared to the cellulose-MWNT three-layered composite of Comparative Example 14. Thereby, it is determined that even though both Comparative Example 14 and Example 7 include the MWNT assembled layers in 3 layers, Example 7 exhibits higher electro-conductivity than Comparative Example 14 since Example 7 further includes 2 layers of the AgNW assembled layers.

[5] The cellulose 10-layered (AgNW, MWMT) composites of Examples 8 and 9 exhibit significantly improved electro-conductivity compared to the cellulose-MWNT five-layered composite of Comparative Example 15.

[6] That is, electro-conductivity of the conductive composite is improved as the AgNW assembled layer and the MWNT assembled layer are alternately stacked on the surface of the cellulose, and improvement of EMI shielding effectiveness is more dependent on the AgNW assembled layer than on the MWNT assembled layer. However, because the MWNT assembled layer has a smaller density than the AgNW assembled layer, density and electro-conductivity of the conductive composite may be varied as desired by differing a stack order of the AgNW assembled layer rather than the MWNT assembled layer, and the stacking number thereof.

Evaluation 5: EMI Shielding Effectiveness of Examples 2 to 9 and Comparative Examples 12 to 15

[1] FIG. 19 is a graph showing EMI shielding effectiveness (SE) of the conductive composites according to Examples 2 to 9 and Comparative Examples 12 to 15. In FIG. 19, total EMI shielding effectiveness measurement values of the conductive composites obtained by adding electromagnetic wave reflection to electromagnetic wave absorption are denoted as $SE_{tot}$(Mea), and theoretical total EMI shielding effectiveness calculated using apparent electro-conductivity (apparent EC) is denoted as $SE_{tot}$(Cal) as in FIG. 11.

[2] Referring to FIG. 19, EMI shielding effectiveness exhibits the same tendency as electro-conductivity in Evaluation 4. In addition, measurement values $SE_{tot}$ (Mea) in Examples 2 to 9 and theoretical values $SE_{tot}$(Cal) exhibit the same tendency within a minute error range. That is, from FIG. 19, $SE_{tot}$(Mea) and $SE_{tot}$(Cal) are adjusted in the examples.

[3] From Evaluation 5, the conductive composite according to an embodiment exhibits improved EMI shielding effectiveness of the conductive composite as the AgNW assembled layer and the MWNT assembled layer are alternately stacked on the surface of the cellulose, and improvement of EMI shielding effectiveness is also more dependent on the AgNW assembled layer rather than the MWNT assembled layer. However, because the MWNT assembled layer has a smaller density than the AgNW assembled layer, density and EMI shielding effectiveness of the conductive composite may be varied as desired by differing a stack order of the AgNW assembled layer rather than the MWNT assembled layer, and the stacking number thereof.

While this disclosure has been described in connection with what is presently considered to be practical exemplary embodiments, it is to be understood that the disclosure is not limited to the present embodiments, but, on the contrary, is intended to cover various modifications and equivalent arrangements included within the spirit and scope of the appended claims.

What is claimed is:

1. A conductive composite comprising:
a polymer matrix comprising a plurality of microcellulose fibers; and a plurality of conductive nanomaterials dispersed in the polymer matrix, wherein the plurality of conductive nanomaterials comprises a metal nanowire, and
wherein the plurality of conductive nanomaterials are disposed on a surface of the plurality of the microcellulose fibers,
wherein a diameter of the plurality of microcellulose fibers is about 1 micrometer to about 990 micrometers, and a diameter of the metal nanowire is about 1 nanometer to about 30 nanometers,
wherein the plurality of conductive nanomaterials provides an assembled layer surrounding a surface of the microcellulose fibers, and
wherein the assembled layer has a density gradient extending from a surface of the polymer matrix to the inside of the polymer matrix in such a way that the density of the assembled layer decreases from the surface of the polymer matrix to the inside of the polymer matrix, and wherein an amount of the conductive nanomaterial in the conductive composite is about 0.005 percent by volume to about 0.80 percent by volume, based on a total volume of the conductive composite.

2. The conductive composite of claim 1, wherein the metal nanowire comprises silver, gold, platinum, palladium, cobalt, nickel, titanium, copper, tantalum, tungsten, or a combination thereof.

3. The conductive composite of claim 2, wherein the plurality of conductive nanomaterials further comprise a carbon nanotube, a graphene nanoparticle, a carbon nanofiber, carbon black, or a combination thereof.

4. The conductive composite of claim 3, wherein the carbon nanotube comprises a single-walled carbon nanotube (SWNT), a multi-walled carbon nanotube (MWNT), or a combination thereof.

5. The conductive composite of claim 3, wherein a diameter of the carbon nanotube is about 1 nanometer to about 20 nanometers.

6. The conductive composite of claim 3, wherein the assembled layer comprises at least two layers wherein the metal nanowire and the carbon nanotube are alternately stacked.

7. The conductive composite of claim 1, wherein the amount of the conductive nanomaterial in the conductive composite is about 0.01 percent by volume to about 0.53 percent by volume, based on a total volume of the conductive composite.

8. The conductive composite of claim 1, wherein the polymer matrix is a cellulose fiber non-woven fabric.

9. The conductive composite of claim 1, wherein a porosity of the conductive composite is about 20% to about 90%.

10. The conductive composite of claim 1, wherein an apparent density of the conductive composite is less than or equal to about 0.6 grams per cubic centimeter.

11. The conductive composite of claim 1, wherein an electro-conductivity of the conductive composite is greater than or equal to about 0.34 Siemens per centimeter.

12. A method of manufacturing a conductive composite, comprising:

providing a polymer matrix comprising a plurality of microcellulose fibers;

forming a plurality of conductive nanomaterials dispersed in the polymer matrix, the plurality of conductive nanomaterials comprising a metal nanowire, and the forming of the plurality of conductive nanomaterials including contacting the polymer matrix with a conductive nanomaterial solution comprising the metal nanowire to form a layer of the conductive nanomaterial disposed on the surface of the polymer matrix; and drying the layer of the conductive nanomaterial disposed on a surface of the polymer matrix to provide the conductive composite, wherein the plurality of conductive nanomaterials are disposed on a surface of the plurality of microcellulose fibers, wherein a diameter of the plurality of microcellulose fibers is about 1 micrometer to about 990 micrometers, and a diameter of the metal nanowire is about 1 nanometer to about 30 nanometers, wherein the plurality of conductive nanomaterials provide an assembled layer surrounding a surface of the plurality of microcellulose fibers, wherein the assembled layer has a density gradient extending from the surface of the polymer matrix to the inside of the polymer matrix in such a way that the density of the assembled layer decreases from the surface of the polymer matrix to the inside of the polymer matrix, and wherein an amount of the conductive nanomaterial in the conductive composite is about 0.005 percent by volume to about 0.80 percent by volume, based on a total volume of the conductive composite.

13. The method of claim 12, wherein the conductive nanomaterial solution further comprises a carbon nanotube, a graphene nanoparticle, a carbon nanofiber, carbon black, or a combination thereof.

14. The method of claim 12, wherein the method further comprises:

determining whether the contacting and drying are repeatedly carried out after the drying.

15. An electronic device comprising the conductive composite of claim 2.

16. A conductive composite comprising:

a polymer matrix comprising a plurality of microcellulose fibers; and a conductive nanomaterial dispersed in the polymer matrix, wherein a diameter of the plurality of microcellulose fibers is about 1 micrometer to about 990 micrometers, wherein a diameter of the conductive nanomaterial is about 1 nanometer to about 30 nanometers, wherein the conductive nanomaterial is positioned on each of the plurality of microcellulose fibers, wherein the conductive nanomaterial shows a density gradient extending from a surface of the polymer matrix to an inside of the polymer matrix, and wherein an apparent density of the conductive composite is less than or equal to about 0.65 grams per cubic centimeter.

17. The conductive composite of claim 16, wherein the conductive nanomaterial comprises a metal nanowire, a carbon nanotube, a graphene nanoparticle, a carbon nanofiber, carbon black, or a combination thereof.

* * * * *